(12) United States Patent
Li et al.

(10) Patent No.: US 11,225,150 B2
(45) Date of Patent: Jan. 18, 2022

(54) POWER SUPPLY MANAGEMENT APPARATUS AND METHOD THEREOF

(71) Applicant: General Electric Company, Schenectady, NY (US)

(72) Inventors: Fei Li, Shanghai (CN); Xi Lu, Shanghai (CN); Jian Zhou, Shanghai (CN); Pengju Kang, Yorktown Heights, NY (US); Ronghui Zhou, Shanghai (CN); Xiangming Shen, Shanghai (CN); Fengchen Sun, Shanghai (CN); Hai Qiu, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 170 days.

(21) Appl. No.: 16/439,199

(22) Filed: Jun. 12, 2019

(65) Prior Publication Data

US 2019/0291594 A1 Sep. 26, 2019

Related U.S. Application Data

(63) Continuation of application No. 14/028,565, filed on Sep. 17, 2013, now Pat. No. 10,363,823.

(30) Foreign Application Priority Data

Sep. 24, 2012 (CN) .......................... 201210358566.2

(51) Int. Cl.
*B60L 50/53* (2019.01)
*B60L 8/00* (2006.01)
(Continued)

(52) U.S. Cl.
CPC .............. *B60L 50/53* (2019.02); *B60L 8/003* (2013.01); *B60L 8/006* (2013.01);
(Continued)

(58) Field of Classification Search
CPC ............ B60L 2200/42; B60L 2200/44; B60L 2200/00; B60L 50/53; B60L 50/00;
(Continued)

(56) References Cited

U.S. PATENT DOCUMENTS 7,036,477 B1  5/2006  Thompson et al.
7,600,595 B2  10/2009  Harris
(Continued)

FOREIGN PATENT DOCUMENTS

CN   201254109 Y   6/2009
EP    20169801 A1   3/2010
(Continued)

OTHER PUBLICATIONS

Extended European Search Report and Opinion issued in connection with corresponding EP Application 13185678.3 dated Sep. 22, 2017.

(Continued)

*Primary Examiner* — Hal Kaplan
*Assistant Examiner* — Swarna N Chowdhuri
(74) *Attorney, Agent, or Firm* — Meagher Emanuel Laks Goldberg & Liao, LLP

(57) ABSTRACT

An apparatus comprising an onboard energy storage device, an onboard power conversion device configured to be electrically coupled to an external power source for receiving electrical power therefrom, and at least one drive system electrically coupled to the onboard energy storage device and the onboard power conversion device, wherein the onboard energy storage device and the onboard power conversion device cooperatively provide electrical power for the at least one drive system. A vehicle and a method for managing power supply are also disclosed.

21 Claims, 13 Drawing Sheets

(51) Int. Cl.
*B60L 15/20* (2006.01)
*B60L 50/90* (2019.01)

(52) U.S. Cl.
CPC .......... *B60L 15/2045* (2013.01); *B60L 50/90* (2019.02); *B60L 2200/40* (2013.01); *Y02T 10/64* (2013.01); *Y02T 10/70* (2013.01); *Y02T 10/7072* (2013.01); *Y02T 10/72* (2013.01)

(58) Field of Classification Search
CPC .. B60L 8/00; B60L 50/10; B60L 50/60; B60L 8/006; B60L 8/003
USPC ........................................................ 307/10.1
See application file for complete search history.

(56) References Cited

U.S. PATENT DOCUMENTS

| | | | |
|---|---|---|---|
| 7,828,099 B2 | 11/2010 | Heckeroth | |
| 8,004,242 B1 | 8/2011 | Purkey | |
| 8,026,632 B2 | 9/2011 | Cook | |
| 8,606,444 B2 | 12/2013 | Andsir | |
| 8,700,246 B2 | 4/2014 | Kurikuma et al. | |
| 8,916,993 B2 | 12/2014 | Berry | |
| 2003/0151387 A1 | 8/2003 | Kumar | |
| 2006/0001399 A1 | 1/2006 | Salasoo et al. | |
| 2007/0086222 A1 | 4/2007 | Iida | |
| 2009/0033148 A1* | 2/2009 | Hoff | B60L 1/00 307/10.1 |
| 2010/0000804 A1 | 1/2010 | Yeh | |
| 2010/0052888 A1* | 3/2010 | Crowe | B60W 20/00 340/461 |
| 2010/0096921 A1 | 4/2010 | Ishida | |
| 2010/0206100 A1* | 8/2010 | Vyas | B60L 50/61 74/15.63 |
| 2010/0264732 A1 | 10/2010 | Beck | |
| 2011/0025126 A1 | 2/2011 | Brabec et al. | |
| 2011/0187184 A1 | 8/2011 | Ichikawa | |
| 2011/0301794 A1 | 12/2011 | Bastien | |
| 2012/0061163 A1* | 3/2012 | Musser | B60L 15/20 180/333 |
| 2012/0123625 A1* | 5/2012 | Ueo | B60L 58/12 701/22 |
| 2012/0173059 A1 | 7/2012 | Andris | |
| 2012/0187759 A1 | 7/2012 | Kamichi et al. | |
| 2012/0258838 A1* | 10/2012 | Hartz | B60W 20/00 477/5 |
| 2013/0134908 A1 | 5/2013 | Sugiyama et al. | |
| 2013/0197766 A1* | 8/2013 | Kurikuma | E02F 9/2091 701/50 |

FOREIGN PATENT DOCUMENTS

| | | |
|---|---|---|
| JP | H10206526 A | 8/1998 |
| JP | 2000-059919 A | 2/2000 |
| JP | 2001-163041 | 6/2001 |
| JP | 2007-288894 A | 11/2007 |
| JP | 2008-308881 A | 12/2008 |
| JP | 4315232 A | 8/2009 |
| JP | 2010-121328 A | 6/2010 |
| JP | 2010279159 A | 12/2010 |
| JP | 20110223834 A | 2/2011 |
| JP | 2011055684 A | 3/2011 |
| JP | 2011-245906 A | 12/2011 |
| WO | 2011/080392 A1 | 7/2011 |
| WO | 2011138308 A1 | 11/2011 |
| WO | 2012053560 A1 | 4/2012 |
| WO | 2012061522 A2 | 5/2012 |
| WO | 2012091834 A2 | 7/2012 |
| WO | 201116134 A1 | 1/2013 |
| WO | 201116135 A | 1/2013 |

OTHER PUBLICATIONS

Machine translation and Notification of Reasons for Refusal issued in connection with corresponding JP Application No. 2013-194766 dated Mar. 6, 2018.
Office Action issued in connection with corresponding JP Application No. 2013194766 dated Jul. 4, 2017.
Unofficial English translation of Chinese Office Action issued in connection with corresponding CN Application No. 21210358566.2 dated May 28, 2015.
Hauchun, et al., "Interactive Charging Strategy of Electric Vehicles Connected In Smart Grids", Power Electronics and Mtion Control Conference (IPEMC), 2012 7th International, Issue Date: Jun. 2-5, 2012, vol. 3, pp. 2099-2103, print ISBN: 978-1-4577-2085-7.

* cited by examiner

POWER SUPPLY MANAGEMENT APPARATUS AND METHOD THEREOF

BACKGROUND OF THE INVENTION

Embodiments of the disclosure relate generally to improved power supply mechanisms for apparatuses and methods for managing power supply thereof.

Vehicles are mobile machines that are designed and used for transporting passengers and/or cargos from one place to another. Examples of the vehicles may include bicycles, cars, trucks, locomotives, tractors, buses, boats, and aircrafts. Traditionally, at least some of these vehicles are powered by engines such as internal combustion engines. The internal combustion engines may operate by burning fuels such as diesels, gasoline, and natural gas for providing necessary power so as to drive motion of the vehicles. However, with rising concerns of scarcity, cost, and negative environmental impact in association with the use of the diesels, gasoline, and natural gas, growing interests have been raised to develop electric powered vehicles such as fully/pure electric vehicles, hybrid electric vehicles (e.g., integration of a battery and internal combustion engine), and plug-in hybrid electric vehicles. However, wide adoption of the electric powered vehicles is limited by a list of factors, one of which is that onboard or built-in energy storage device such as battery fails to meet the mileage requirement.

Therefore, it is desirable to provide improved apparatuses and methods to address one or more of the above-mentioned limitations.

BRIEF DESCRIPTION OF THE INVENTION

In accordance with an aspect of the present disclosure, an apparatus is provided. The apparatus comprises an onboard energy storage device, an onboard power conversion device, and at least one drive system. The onboard power conversion device is configured to be electrically coupled to an external power source for receiving electrical power therefrom. The at least one drive system is electrically coupled to the onboard energy storage device and the onboard power conversion device. The onboard energy storage device and the onboard power conversion device cooperatively provide electrical power for the at least one drive system.

In accordance with an aspect of the present disclosure, a vehicle is provided. The vehicle comprises an onboard energy storage device for providing a first Direct Current (DC) power; an Alternating Current-Direct Current (AC-DC) converter configured to be electrically coupled to a utility power grid for receiving input Alternating Current (AC) power from the utility power grid and converting the input AC power to provide a second DC power; a DC bus electrically coupled to the onboard energy storage device and the AC-DC converter for receiving the first DC power and the second DC power respectively; a traction inverter electrically coupled to the DC bus for converting at least one of the first DC power and the second DC power received at the DC bus to traction AC power; and a traction motor electrically coupled to the traction inverter, the traction motor configured to convert the traction AC power received from the traction inverter to mechanical power to drive movement of the vehicle, wherein the AC-DC converter continues receiving the input AC power from the utility power grid to maintain the movement of the vehicle.

In accordance with an aspect of the present disclosure, a method of managing power supply of an apparatus is provided. The method comprises: receiving input alternating current (AC) power from a utility power grid; converting the received input AC power to provide a first DC power; and converting at least part of the first DC power to at least one of a traction AC power and a power take-off (PTO) AC power, respectively, for a traction motor and a PTO motor of the apparatus; wherein receiving input AC power from a utility power grid is implemented concurrently with converting at least part of the first DC power to at least one of a traction AC power and a PTO AC power.

In accordance with an aspect of the present disclosure, a computer-readable storage medium is provided. The computer-readable storage medium has a plurality of instructions stored thereon. The plurality of instructions can be executed by one or more processors to achieve the following: receiving input alternating current (AC) power from a utility power grid; converting the received input AC power to provide a first DC power; and converting at least part of the first DC power to at least one of a traction AC power and a power take-off (PTO) AC power, respectively, for a traction motor and a PTO motor of the apparatus; wherein receiving input AC power from a utility power grid is implemented concurrently with converting at least part of the first DC power to at least one of a traction AC power and a PTO AC power.

DRAWINGS

These and other features, aspects, and advantages of the present disclosure will become better understood when the following detailed description is read with reference to the accompanying drawings in which like characters represent like parts throughout the drawings, wherein:

DETAILED DESCRIPTION OF THE INVENTION

Figure 1:
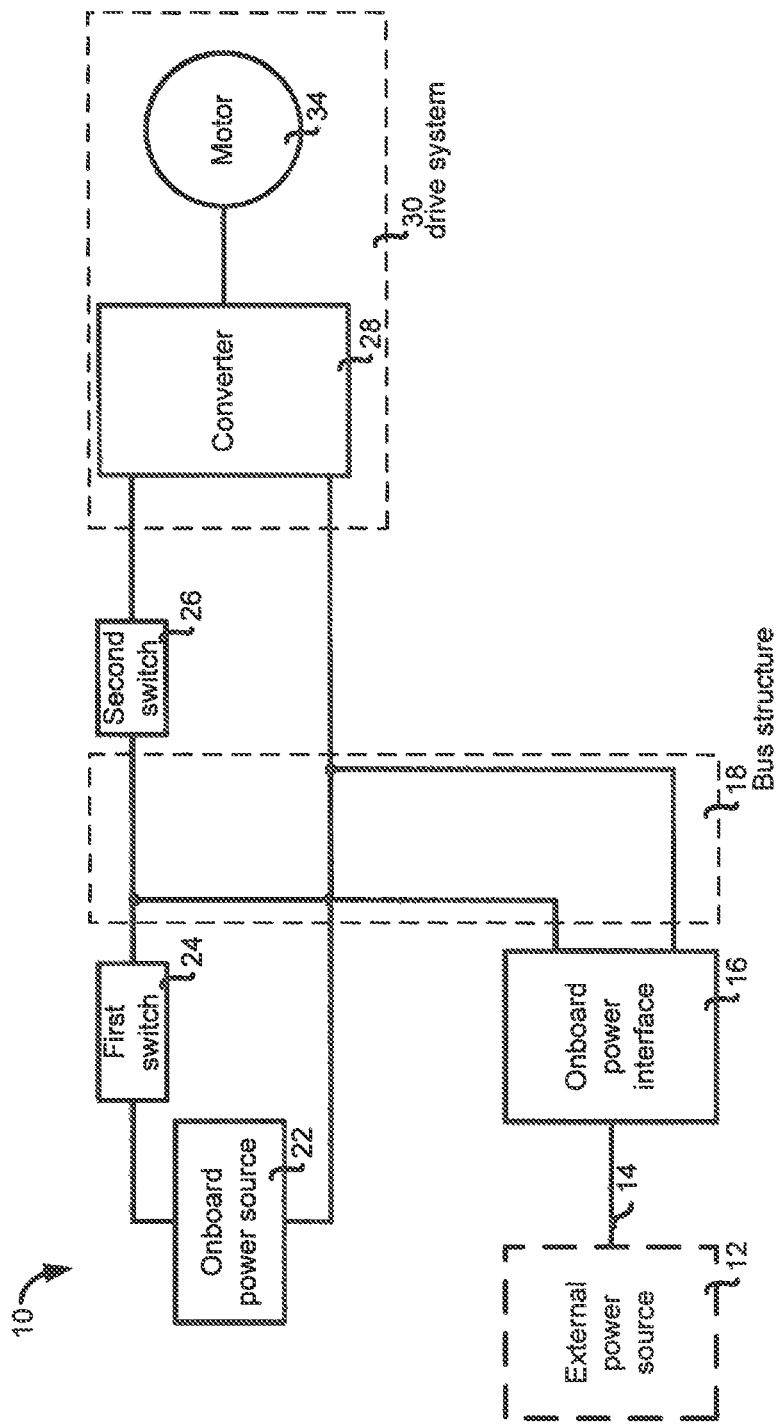
FIG. 1 is an overall block diagram of a vehicle in accordance with an exemplary embodiment of the present disclosure.

Embodiments disclosed herein generally relate to improved power supply mechanisms for vehicles and method for managing the power supply thereof. More specifically, the present disclosure proposes a new hybrid electrical power supply mechanism, dual electrical power supply mechanism, or electric-electric hybrid power supply mechanism for vehicles. As used herein, the term "hybrid electrical power supply mechanism," "dual electrical power supply mechanism," or "electric-electric hybrid power supply mechanism" refers to a power supply mechanism that, at least in some modes of operation, a vehicle can be operated with electrical power cooperatively provided from a first electrical power arrangement and a second electric power arrangement. In some implementations, the first electrical power arrangement may comprise an onboard or built-in electrical power source (e.g., onboard energy storage device such as a battery or battery pack) capable of storing electrical power therein and providing electrical power for maintaining the operation of the vehicle. The second electrical power arrangement may comprise an onboard or built-in power interface or power conversion device integrated with the vehicle. The onboard or built-in power interface or power conversion device is capable of being coupled to an external power source and converting the electrical power received from an external power source (e.g., a utility power grid) to a suitable form for use by the vehicle (e.g., charging the onboard energy storage device or driving at least one drive system in association with the vehicle). As such, when the external power source is available to the vehicle, the proposed hybrid electrical power supply mechanism can be implemented to cooperatively provide electrical power to maintain operations of the vehicle; while when the external power source is unavailable, the vehicle can be powered by the onboard energy storage device.

In some implementations, based on the proposed hybrid electrical power supply mechanism, dual electrical power supply mechanism, or electric-electric hybrid power supply mechanism, the vehicle can be arranged or programmed to operate in a plurality of modes. One of the operation modes is separate operation control which refers to the first electrical power arrangement and the second electrical power arrangement are operating separately for supplying electrical power to the vehicle. More particularly, for the separate operation control, when the second electrical power arrangement is available, the first electrical power arrangement is disabled and the second electrical power arrangement is responsible for supplying electrical power to maintain the operation of the vehicle; while when the second electrical power arrangement is not available, the first electrical power arrangement is enabled to supply electrical power to maintain the operation of the vehicle. Another operation mode of the vehicle is series hybrid operation control which refers to the first electrical power arrangement and the second electrical power arrangement simultaneously supply electrical power to at least one drive system of the vehicle. Yet another operation mode of the vehicle is combined charging and operation control which refers to the second electrical power arrangement can be configured to simultaneously supply electrical power to the first electrical power arrangement (e.g., charging a battery or battery pack) and at least one drive system in association with the vehicle. A wide range of vehicles can benefit from the hybrid electrical power supply mechanism as well as the various modes of operation proposed herein. Non-limiting examples of the vehicles may include land vehicles that drive against ground, such as bicycles, motorcycles, cars, trucks, vans, buses, tractors, off-way vehicles, agricultural tractors, E-buses, golf cars, industrial construction machines, trailers, locomotives, trains, and subways, to name just a few. The vehicles may also include water vehicles or marine vessels, such as ships, boats, and the like, to name just a few. Furthermore, the vehicles may include air vehicles such as aircrafts, planes, and the like.

The present disclosure can achieve various technical effects or technical advantages, one of which is that the mileage of the vehicle can be extended in at least some modes of operation. For example, in the series hybrid operation control mode, the onboard power source such as an onboard battery can be charged during the drive system is being supplied with electrical power from the onboard power interface. In some embodiments, a conventional internal combustion engine (ICE) may be removed from the vehicle of the present disclosure. Implementing the vehicle without the use of ICEs may not only contribute to a reduction of tailpipe pollutants, but also help to reduce or eliminate noise emissions. Other technical effects or technical advantages will become apparent to those skilled in the art by referring to the detailed descriptions provided herein and the accompanying drawings.

In an effort to provide a concise description of these embodiments, not all features of an actual implementation are described in the one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "circuit," "circuitry," and "controller" may include either a single component or a plurality of components, which are either active and/or passive components and may be optionally connected or otherwise coupled together to provide the described function.

Turning now to the drawings, first referring to FIG. 1, in which there is shown an overall block diagram of a vehicle 10 in accordance with one exemplary embodiment of the present disclosure. In general, the vehicle 10 is adapted to implement the above-mentioned hybrid electrical power supply mechanism in a manner that at least two sources of electrical power are cooperatively provided to maintain the operation of the vehicle 10. As shown in FIG. 1, the vehicle 10 may include at least one first power source or an onboard power source 22 which is configured to supply a first form of electrical power or internally-supplied electrical power 202 with suitable voltage and/or power to facilitate driving motion of the vehicle 10 and/or to facilitate performing some specific tasks in association with the vehicle 10. Depending on the specific types of vehicle 10, the specific tasks performed by the vehicle 10 may include mowing plants, plowing ground, lifting materials, shoveling materials, excavating materials, and dumping materials, and so on. In one embodiment, the onboard power source 22 may be an onboard energy storage device such as a battery or battery pack consisting of multiple battery cells coupled together in series and/or parallel configuration. Non-limiting examples of the battery or battery pack may include lead acid batteries, nickel cadmium batteries (NiCd), nickel metal hydride batteries (NiMH), lithium ion batteries, lithium polymer batteries, and so on. In some embodiments, the battery-type onboard energy storage device 22 may be physically replaced with a new fully charged one, if the battery power is depleted. Also, a person skilled in the art will recognize that a variety of energy storage components, such as ultracapacitor, fly-wheel, and any other components capable of storing electrical energy can be additionally or alternatively used in association with the vehicle 10.

With continued reference to FIG. 1, the vehicle 10 also includes an onboard power interface 16 which functions as a power interface between various components of the vehicle 10 and an external power source 12. The onboard power interface 16 is configured to provide a second source of electrical power to maintain operation of the vehicle 10. In one embodiment, the onboard power interface 16 is electrically coupled to the external power source 12 via an electrical link 14. In one embodiment, the electrical link 14 between the external power source 12 and the onboard power interface 16 may be one or more electric wires or electric cables. In other embodiments, the electrical link 14 may be wireless electrical power transfer link. In some specific embodiments, the electrical link 14 between the onboard power interface 16 and the external power source 12 is arranged to be flexible. For example, in some applications, an electrical wire of the electrical link 14 is arranged to have sufficient length to allow the onboard power interface 16 to continue receiving electrical power while the drive system 30 is operating to drive motion of the vehicle 10 or perform one or more specific tasks in association with the vehicle 10. In one embodiment, the onboard power interface 16 may be an onboard power conversion device which is configured to perform power conversion with respect to the electrical power received from the external power source 12 and provide converted electrical power with suitable voltage and/or power to various components of the vehicle 10. Depending on the various operation modes of the vehicle 10 which will be described in more detail below, the electrical power provided from the onboard power interface 16 can be delivered to charge the onboard energy storage source 22, or delivered to a drive system 30 for driving motion of the vehicle 10 or performing one or more specific tasks (e.g., mowing grass, plowing ground, lifting materials, shoveling materials, excavating materials, and dumping materials) in association with the vehicle 10.

With continued reference to FIG. 1, the vehicle 10 may further include a first switch 24. The first switch 24 is electrically coupled to the onboard power source 22 and a bus structure 18. The bus structure 18 may be any suitable arrangements such as DC bus for facilitating unidirectional or bidirectional energy transfer between various components of the vehicle 10. For example, the bus structure 18 may receive input such as DC electrical power provided from the onboard power interface 16. The bus structure 18 may also provide output such as at least a part of the DC electrical power to charge the onboard power source 22. The first switch 24 can be any type of mechanical and/or electrical devices or combinations thereof. The first switch 24 can be closed to establish or form a power/energy transfer link between the onboard power source 22 and the bus structure 18, such that charging and/or discharging of the onboard power source 22 can be realized. As used herein, "closed" may refer to an "ON" status of a switch that low impedance is created by operating the switch. The first switch 24 can also be opened to terminate or cut off the power/energy transfer link between the onboard power source 22 and the bus structure 18, such that the onboard power source 22 may not be able to supply electrical power to other vehicle components or the onboard power source 22 can be protected from over-charging or over-discharging problems. As used herein, "opened" may refer to an "OFF" status of a switch that high impedance is created by operating the switch. In one embodiment, the opening and closing of the first switch 24 can be manually performed by an operator or a user such as a driver according to real-time operating conditions and/or requirements of the vehicle 10. In other embodiments, the first switch 24 can be automatically switched according to on/off signals which may be generated by monitoring various operating conditions and/or statuses of the vehicle 10.

With continued reference to FIG. 1, the vehicle 10 may further include a second switch 26. The second switch 26 is electrically coupled to the bus structure 18 and a drive system 30. The second switch 26 can be any type of mechanical and/or electrical devices or combinations thereof. Similar to the first switch 24 discussed above, the second switch 26 can also be manually switched or automatically switched to establish or terminate a power/energy transfer link between the bus structure 18 and the drive system 30, such that unidirectional or bidirectional power transfer between the bus structure 18 and the drive system 30 can be enabled or disabled. In one embodiment, as shown in FIG. 1, the drive system 30 may include a converter 28 and a motor 34. The converter 28 is one type of a power conversion device functioning to convert one form of electrical power to another. For example, the converter 28 may be a DC-AC power conversion device configured to convert DC power received from a DC bus of the bus structure 18 to AC power. The AC power (e.g., three-phase AC power) is supplied to the motor 34 (e.g., three-phase AC motor) such that the motor 34 can be operated to provide a mechanical output such as torque output to drive the vehicle 10 to move. In other embodiments, the motor 34 can also provide mechanical outputs for one or more implements or tools designed to perform specific tasks.

With continued reference to FIG. 1, the vehicle 10 can be configured or programmed to provide a plurality of modes of operation. Switching between the operation modes of the vehicle 10 may be implemented according to instructions/commands input from an operator or a user such as a driver. In some alternative embodiments, it is possible that in an unmanned vehicle 10, switching or transition between the operation modes can be automatically performed according to operation conditions and/or statuses of the vehicle 10.

In a first aspect, the vehicle 10 may be configured to provide a first operation mode of separate control. In the separate control operation mode, the vehicle 10 can be further configured to operate in different states depending on for example whether the external power source 12 is available for supplying electrical power to the vehicle 10.

In a first condition, the external power source 12 may be unavailable to the vehicle 10, that is, the onboard power interface 16 is electrically decoupled with the external power source 12. In this condition, upon determining that the onboard power source 22 has sufficient remaining power stored therein, the onboard power source 22 can be operated to provide electrical power to various components of the vehicle 10, which may be referred to as battery powered mode. In one embodiment, to enable the power transfer, the first switch 24 and the second switch 26 are closed or turned on to allow the electrical power obtained from a battery or battery pack of the onboard power source 22 to be transferred to the bus structure 18. In one embodiment, the converter 28 receives electrical power at the bus structure 18 and converts the electrical power to a suitable form of the motor 34 to operate. As a result, the motor 34 can provide necessary mechanical outputs for driving motion of the vehicle 10 or performing specific tasks in association with the vehicle 10.

In a second condition, the external power source 12 is available to the vehicle 10 and the onboard power interface 16 can be electrically coupled to the external power source 12 to receive electrical power therefrom. The onboard power interface 16 can provide electrical power to various components of the vehicle 10, which may be referred to as plugin mode. In the plugin mode, when the onboard power source 22 such as a battery or battery pack is determined to have insufficient remaining power, the first switch 24 can be closed or turned on and the second switch 26 can be opened or turned off. That is, the power transfer link between the bus structure 18 and the drive system 30 is cut off to disable the operation of the drive system 30, while the power transfer link between the bus structure 18 and the onboard power source 22 is established to allow electrical power to be delivered through the power transfer link to charge the battery or battery pack of the onboard power source 22. Still in the plugin mode, when it is determined that the onboard power source 22 has sufficient remaining power, the onboard power interface 30 can provide electrical power to other components of the vehicle 10. For example, the first switch 24 can be opened and the second switch 26 can be closed. That is, the power transfer link between the onboard power source 22 and the bus structure 18 is cut off to make the onboard power source 22 standby, while the power transfer link between the bus structure 18 and the drive system 30 is established to allow the electrical power obtained from the onboard power interface 16 to be transferred to the drive system 30. Consequently, the drive system 30 can provide mechanical outputs for driving motion of the vehicle 10 or performing specific tasks in association with the vehicle 10.

In a second aspect, the vehicle 10 may be configured to provide a second operation mode of series hybrid control. In the series hybrid control mode, upon determining that the external power source 12 is available, the onboard power interface 16 can be electrically coupled to the external power source 12 to receive electrical power therefrom and provide converted electrical power to the bus structure 18. If the onboard power source 22 such as a battery or battery pack is determined to have insufficient remaining power (e.g., a SOC of the battery or battery pack is below than a first threshold value, e.g., 10%), the first switch 24 is closed and the second switch 26 is opened. That is, the energy transfer link between the onboard power source 22 and the bus structure 18 is established to allow electrical power to be delivered through the energy transfer link for charging the battery or battery pack of the onboard power source 22. The energy transfer link between the bus structure 18 and the drive system 30 is cut off to disable the operation of the drive system 30. Still in the series hybrid control mode, if the onboard power source 22 such as a battery or battery pack is determined to have sufficient remaining power (e.g., a SOC of the battery or battery pack is above a second threshold value, e.g., 80%), both the first switch 24 and the second switch 26 are closed or turned on. In this case, the onboard power source 22 and the onboard power interface 16 can be paralleled to provide electrical power to the drive system 30, as such, the drive system 30 can be operated to drive motion of the vehicle 10 and/or perform specific tasks in association with the vehicle 10. In some embodiments, the amount of the electrical power provided from the onboard power source 22 and the amount of the electrical power provided from the onboard power interface 16 can be determined according to some predetermined distribution rules. For example, in one embodiment, the onboard power interface 16 is controlled to provide average power for the drive system 30, while the onboard power source 22 is controlled to provide dynamic power for the drive system 30. That is, when a traction motor of the drive system 30 requires large mechanical torque to accelerate the vehicle 10 or an implement or tool of the vehicle 10 requires large torque to perform special tasks, the onboard power source 22 can be configured to provide peak power to meet this requirement. When the traction motor of the drive system 30 doesn't require large mechanical torque or the implement or tool of the vehicle 10 is operating with light load, the onboard power source 22 can reduce its electrical power output. In a specific embodiment, the onboard power interface 16 may be controlled to operate at a constant output voltage mode, thus design of the onboard power interface 16 can be simplified.

In a third aspect, the vehicle 10 may be configured to provide a third operation mode of combined charging and operation control. In the combined charging and operation control mode, charging of the onboard power source 22 and driving of the drive system 30 can be performed concurrently or simultaneously. More specifically, when the external power source 12 is available, the onboard power interface 16 can be electrically coupled to the external power source 12 to receive the electrical power therefrom and convert the received electrical power to a suitable form for the bus structure 18. In one embodiment, both the first switch 24 and the second switch 26 can be closed or turned on. That is, a first energy transfer link between the onboard power source 22 and the bus structure 18 can be established to allow at least a part of the electrical power at the bus structure 18 to be delivered through the first energy transfer link for charging a battery or a battery pack of the onboard power source 22. Also, a second energy transfer link between the bus structure 18 and the drive system 30 can be established to allow at least part of the electrical power at the bus structure 18 to be delivered through the second energy transfer link for driving motion of the vehicle 10 and/or performing one or more specific tasks in association with the vehicle 10. In a specific embodiment, the onboard power interface 16 is controlled to operate at a constant current mode. In one embodiment, in the constant current mode, a current reference for charging a battery or battery back of the onboard power source 22 can be determined based at least in part on a desired power of the drive system 30 and a desired charging power of the onboard power source 22. Still in the combined charging and operation control mode, when it is determined that a battery or battery pack of the onboard power source 22 is charged to have sufficient remaining power (e.g., a SOC of the battery or battery exceeding a high-SOC threshold value, e.g., 80%), the onboard power interface 16 and the onboard power source 22 can be paralleled to provide electrical power to the drive system 30, as such, the drive system 30 can drive motion of the vehicle 10 and/or perform one or more specific tasks in association with the vehicle 10.

Figure 2:
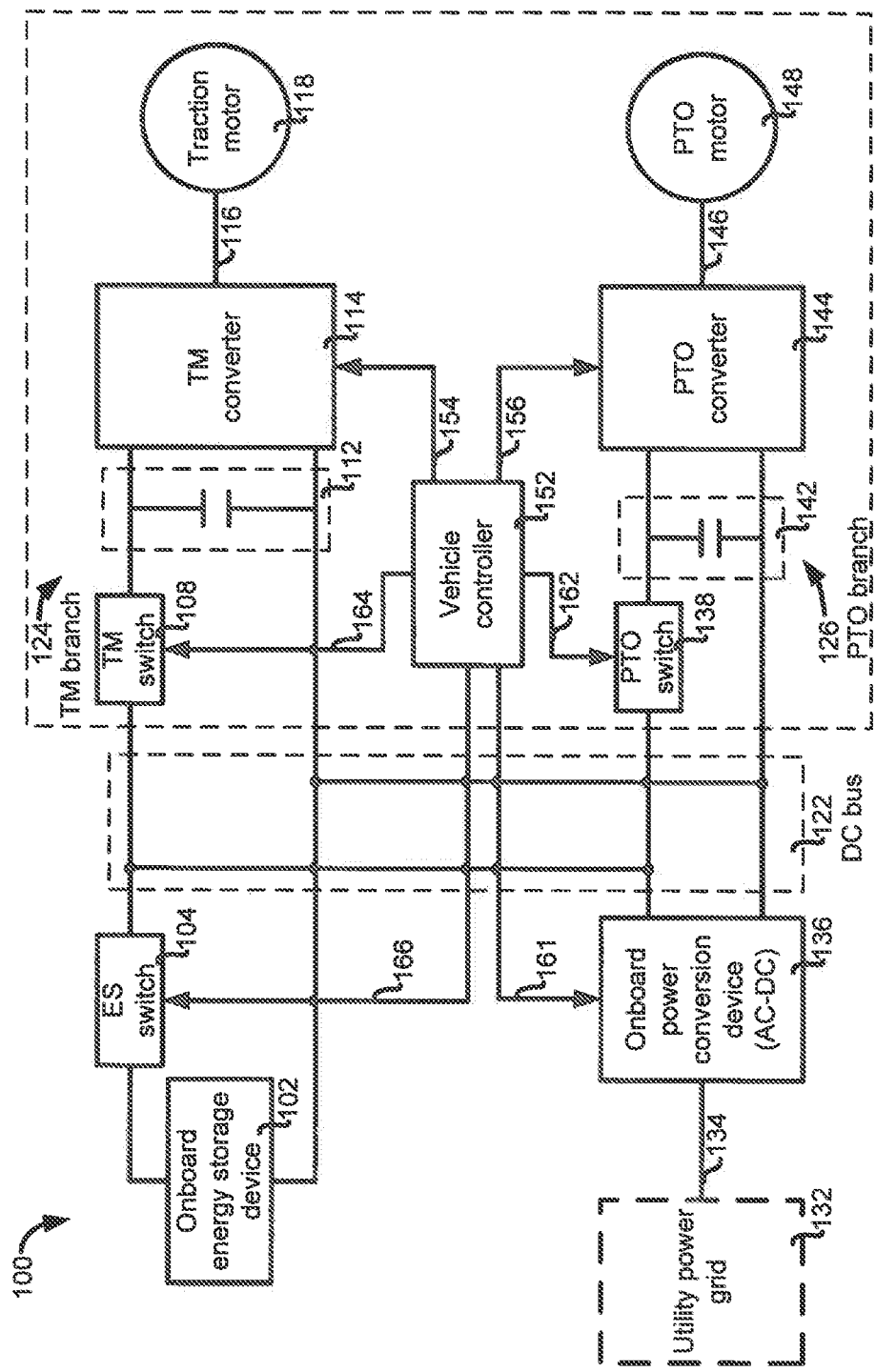
FIG. 2 is a detailed block diagram of a vehicle in accordance with an exemplary embodiment of the present disclosure.

FIG. 2 illustrates a detailed block diagram of a vehicle 100 in accordance another exemplary embodiment of the present disclosure. As shown in FIG. 2, the vehicle 100 includes an onboard energy storage device 102 which may be a battery or battery back with suitable current and/or power output. The onboard energy storage device 102 is electrically coupled to an ES switch 104 which can be switched on and off according to switching signals 166 transmitted from a vehicle controller 152. In alternative embodiments, the ES switch 104 can be manually switched on and off by an operator. The vehicle 100 further includes an onboard power conversion device 136 which may be electrically coupled to a utility power grid 132. In one embodiment, when the utility power grid 132 is available for supplying electrical power, the utility power grid 132 may provide AC electrical power 134 (e.g., 220V or 380V electrical power depending on local grid standard) to the onboard power conversion device 136. In one embodiment, the onboard power conversion device 136 may include an AC-to-DC conversion device (e.g., rectifier) which is configured for converting the AC electrical power 134 according to control signals 162 transmitted from the vehicle controller 152 and provide DC electrical power with suitable voltage and/or power. The DC electrical power is supplied to a DC bus 122 for further delivery to various components of the vehicle 100.

With continued reference to FIG. 2, the vehicle 100 further include a drive system 30 which can be supplied with electrical power from the onboard energy storage device 102 and/or the onboard power conversion device 136. In one embodiment, the drive system 30 may include a traction drive system or TM branch as indicated by reference numeral 124 in FIG. 1. The traction drive system or the TM branch 124 is arranged for providing necessary mechanical output for driving motion of the vehicle 100. In one embodiment, the TM branch 124 includes a TM switch 108, a TM bus 112, a TM converter 114, and a traction motor 118. The TM switch 108 is electrically coupled between the DC bus 122 and the TM bus 112. In one embodiment, the TM switch 108 can be opened or closed according to switching signals 164 transmitted from the vehicle controller 152, such that energy/power transfer link between the DC bus 122 and the TM branch 124 can be established or terminated. The energy flow between the DC bus 122 and the TM branch 124 can be unidirectional or bidirectional.

The TM converter 114 is electrically coupled between the TM bus 112 and the traction motor 118. The TM converter 114 is configured to perform power conversion by converting DC electrical power received from the TM bus 112 to an output power 116 with suitable form for use by the traction motor 118. In one embodiment, the TM converter 114 may comprise an inverter such as a DC-AC inverter which is capable of converting the DC electrical power at the TM bus 112 to AC electrical power 116 (e.g., three-phase AC electrical power). The AC electrical power 116 can be regulated by a vehicle controller 152. For example, in one embodiment, in response to a traction torque command signal generated by operating an input device such as an acceleration pedal, the vehicle controller 152 can send control signals 154 to the TM converter 114 to cause the TM converter 114 to provide regulated AC electrical power 116 for the traction motor 118. As such, the traction motor 118 (e.g., AC electric motor) can operate according to the AC electrical power 116 to provide desired torque output for driving motion of the vehicle 100. In other embodiments, the traction motor 118 may include a DC motor and correspondingly the TM converter 114 may comprise a DC-DC converter to perform DC power conversion. The vehicle controller 152 may include any suitable programmable circuits or devices such as a digital signal processor (DSP), a field programmable gate array (FPGA), a programmable logic controller (PLC), and an application specific integrated circuit (ASIC).

With continued reference to FIG. 2, the drive system 30 may further include a power take-off (PTO) drive system or a PTO branch as indicated by reference numeral 126 in FIG. 2. For purpose of illustration and description, only a single PTO branch 124 is shown and described herein, however, a person having ordinary skill in the art will recognize that in some alternative embodiments, the drive system 30 may include a plurality of PTO branches which may be configured in parallel with each other. The PTO drive system or the PTO branch 126 is arranged for providing necessary mechanical power output for example torque output, for performing one or more specific tasks in association with the vehicle 100. Examples of the specific tasks may include mowing plants, plowing grounds, lifting materials, shoveling materials, excavating materials, and dumping materials. In one embodiment, the PTO drive system or the PTO branch 126 may include a PTO switch 138, a PTO bus 142, a PTO converter 144, and a PTO motor 148. The PTO switch 138 is electrically coupled between the DC bus 122 and the PTO bus 142. The PTO switch 138 can be switched on or off according to PTO switching signals 162 transmitted from the vehicle controller 152, such that an energy/power transfer link between the DC bus 122 and the PTO branch 126 can be established or terminated. The energy flow between the DC bus 122 and the PTO branch 126 can be unidirectional and bidirectional.

The PTO converter 144 is electrically coupled between the TM bus 142 and the PTO motor 148. The PTO converter 144 is configured to perform power conversion by converting DC electrical power received at PTO bus 142 to a PTO output 146 having a suitable form for use by the PTO motor 148. In one embodiment, the PTO converter 144 may comprise a PTO DC-AC converter or PTO inverter which is capable of converting DC electrical power received at the PTO bus 142 to AC electrical power 146 (e.g., three-phase AC electrical power). Also, the AC electrical power 146 can be regulated by the vehicle controller 152. For example, in one embodiment, in response to a PTO torque command signal generated by operating an input device installed with the vehicle 100, the vehicle controller 152 can send control signals 156 to the PTO converter 144 to cause the PTO converter 144 to provide regulated AC electrical power 146 for the PTO motor 148. As such, the PTO motor 148 can operate according to the AC electrical power 146 to provide desired torque output for performing one or more specific tasks in association with the vehicle 100. In other embodiments, the PTO motor 148 may include a DC motor and correspondingly the PTO converter 144 may comprise a DC-DC converter to perform DC power conversion. In some applications, for example, in a forklift apparatus, the PTO motor 148 may be associated with one or more hydraulic pump systems for performing the tasks of lifting and transporting materials/cargoes.

The vehicle 100 shown in FIG. 2 can be configured or programmed to operate with a plurality of modes, such as separate control mode, series hybrid control mode, and combined charging and operation mode. Detailed description of these operations mode will be described later with reference to flow chart diagram of FIGS. 9-13. Before describing the flow chart diagrams, various structural embodiments of the vehicle are described with reference to FIGS. 3-8.

Figure 3:
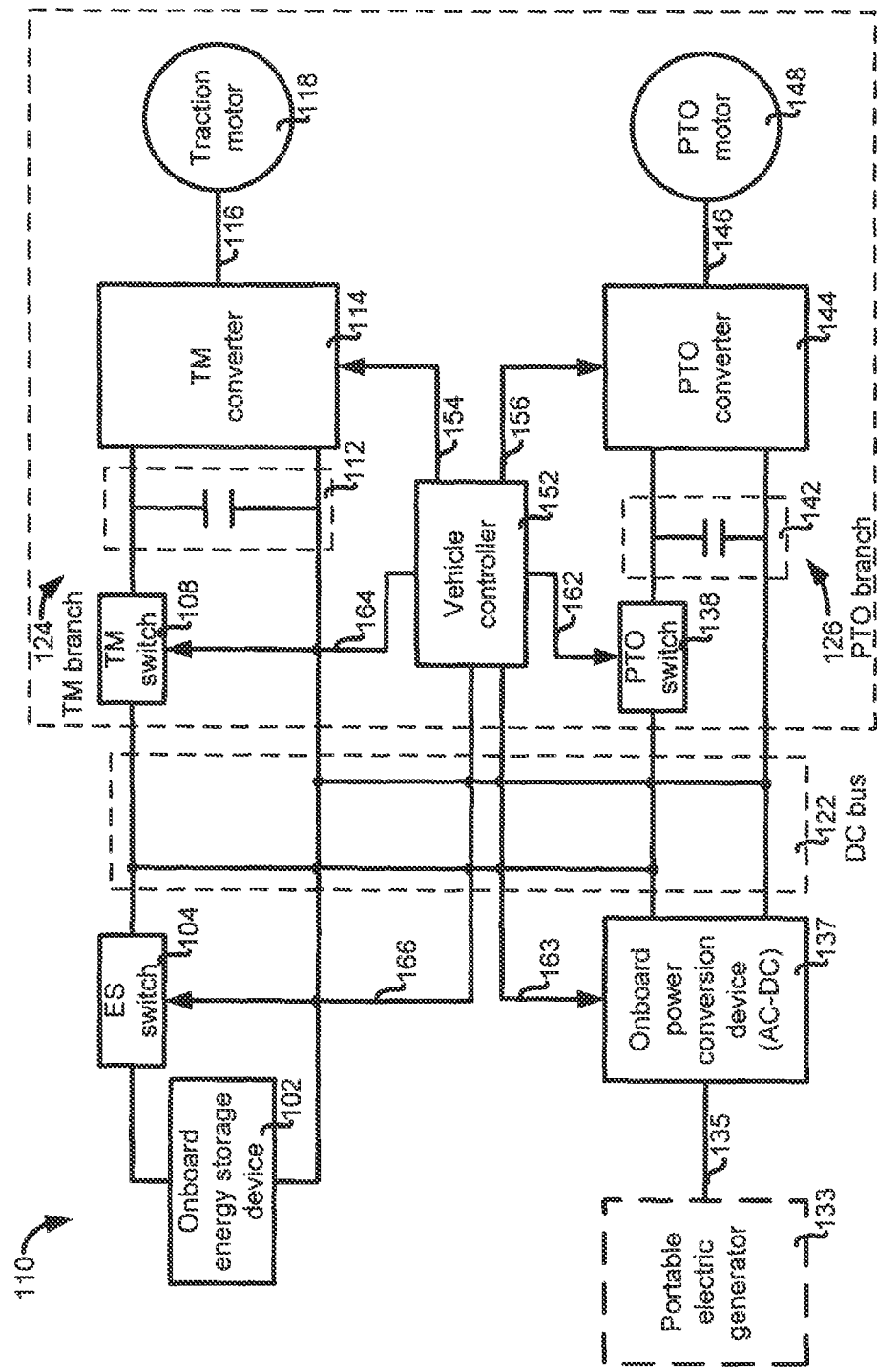
FIG. 3 is a detailed block diagram of a vehicle in accordance with an exemplary embodiment of the present disclosure.

FIG. 3 illustrates a detailed block diagram of a vehicle 110 in accordance with another exemplary embodiment of the present disclosure. The overall structure of the vehicle 110 and the operation thereof is substantially similar to the vehicle 100 that has been described with reference to FIG. 2. One of the differences of the vehicle 110 shown in FIG. 3 is that the onboard power conversion device 137 is electrically coupled to a portable electricity generator 133. The portable electricity generator 133 may run on diesel fuel, gasoline, or other suitable material. When the portable electricity generator 133 is available, the onboard power conversion device 137 can be electrically coupled to the portable electricity generator 133 and receive the electrical power 135 (e.g., AC electrical power) from the portable electricity generator 133 and convert the received electrical power 135 to suitable form for use by various components of the vehicle 110. In one embodiment, the onboard power conversion system 137 may comprise an AC-DC conversion device which is capable of converting AC electrical power 135 to DC electrical power supplied to a DC bus 122. The electrical power output from the onboard power conversion device 137 can be regulated according to control signals 163 transmitted from the vehicle controller 152. The vehicle 110 shown in FIG. 3 can also be configured to operate with a plurality of modes, such as separation control mode, series hybrid control mode, and combined charging and operation control mode, which will be described in more detail below with reference to the flow chart diagrams of FIGS. 9-13.

Figure 4:
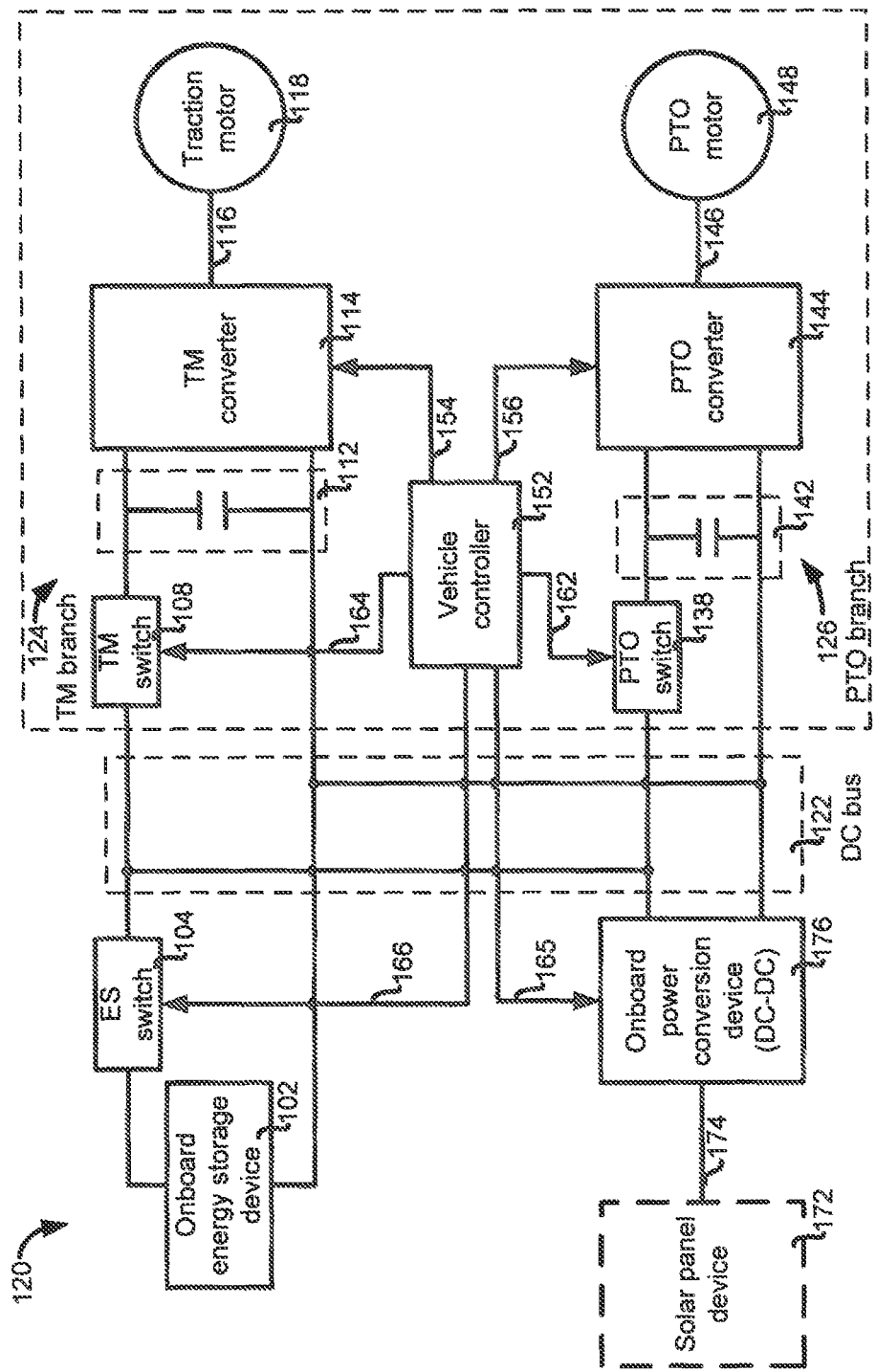
FIG. 4 is a detailed block diagram of a vehicle in accordance with an exemplary embodiment of the present disclosure.

FIG. 4 illustrates a detailed block diagram of a vehicle 120 in accordance with another exemplary embodiment of the present disclosure. The overall structure of the vehicle 120 shown in FIG. 4 and the operations thereof is substantially similar to the vehicle 100 shown and described with reference to FIG. 2. One of the differences of the vehicle 120 shown in FIG. 4 is that an onboard power conversion device 176 is electrically coupled to a solar panel device 172. The solar panel device 172 is one type of a renewable power generation device which is designed for converting solar or light irradiation energy into electrical energy for direct consumption by household or transmission and distribution by a power grid. In some embodiments, the solar panel device 172 is arranged as a standalone device which is located separate with respect to the vehicle 120. In some other embodiments, the solar panel device 172 may be integrated with the vehicle 120. As such, when the solar panel device 172 is available to provide electrical power converted from solar irradiation, the onboard power conversion device 176 can be configured to receive electrical power 174 provided from the solar panel device 172 and convert the electrical power 174 to an electrical power with suitable voltage and/or power for delivering to various components of the vehicle 120. In one embodiment, the onboard power conversion device 176 may include a DC-DC converter which is configured to perform DC-DC power conversion to provide DC electrical power with suitable voltage and/or power. Also, the DC electrical power provided from the DC-DC converter 176 can be regulated according to control signals 165 transmitted from the vehicle controller 152. The vehicle 120 shown in FIG. 4 can also be configured to operate with a plurality of modes, such as separation control mode, series hybrid control mode, and combined charging and operation control mode, which will be described in more detail below with reference to the flow chart diagrams of FIGS. 9-13.

Figure 5:
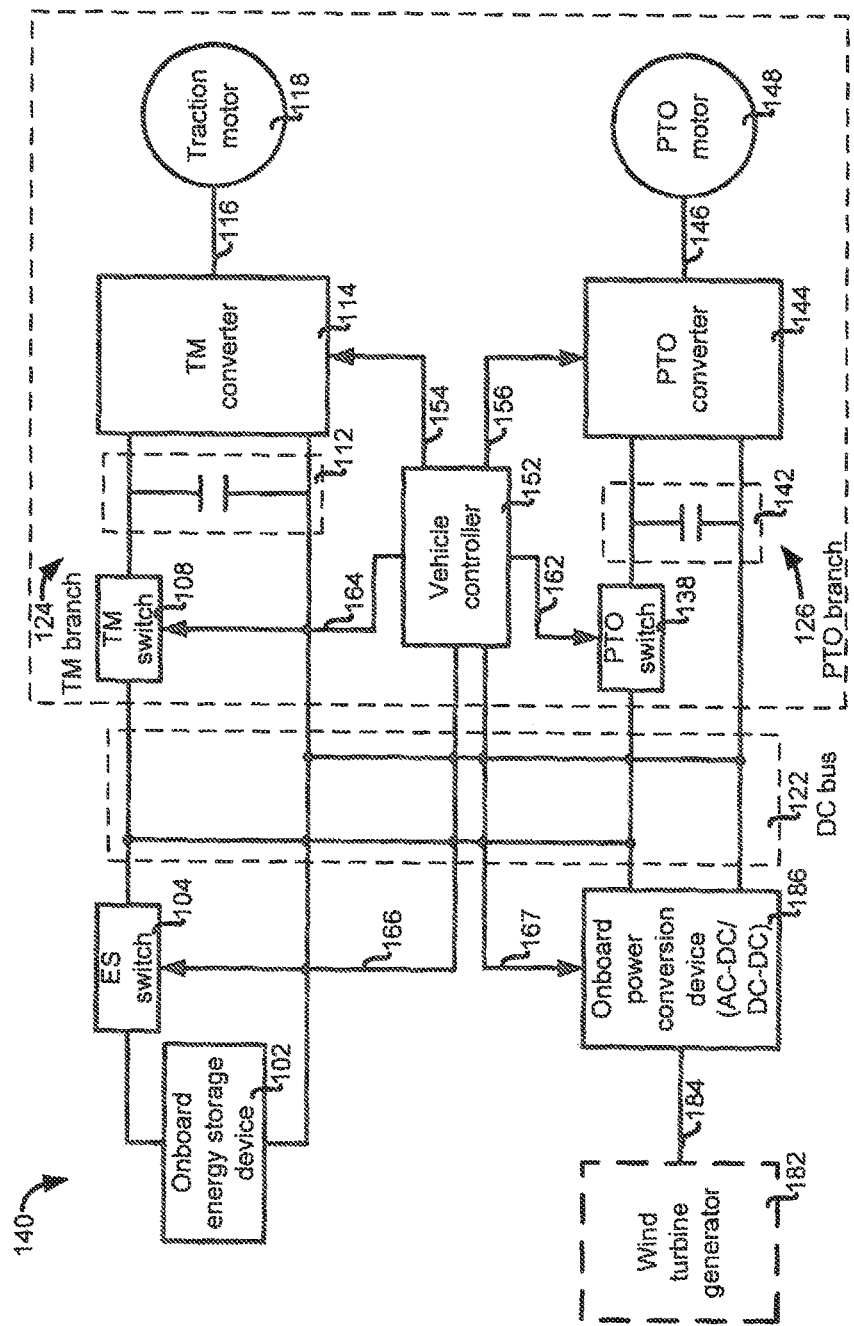
FIG. 5 is a detailed block diagram of a vehicle in accordance with an exemplary embodiment of the present disclosure.

FIG. 5 illustrates a detailed block diagram of a vehicle 140 in accordance with another exemplary embodiment of the present disclosure. The overall structure of the vehicle 140 shown in FIG. 5 and the operations thereof are substantially similar to the vehicle 100 shown and described with reference to FIG. 2. One of the differences of the vehicle 140 shown in FIG. 5 is that the onboard power conversion device 186 can be electrically coupled to a wind turbine generator 182. A wind turbine generator 182 is another form of renewable power generation device that is designed for converting kinetic energy of wind into electrical energy for grid transmission and/or distribution. In some embodiments, multiple wind turbine generators 182 may be grouped together as a wind farm for providing greater power output. In one embodiment, one or more wind turbine generators 182 may be integrated with the vehicle 140. In other embodiments, one or more wind turbine generators 182 may be separately arranged with respect to the vehicle 140. In one embodiment, when the wind turbine generator 182 is available to provide electrical power converted from wind energy, the onboard power conversion device 186 can be electrically coupled to the wind turbine generator 182 and receive the electrical power 184 therefrom. In one embodiment, the electrical power 184 provided from the wind turbine generator 182 may be AC power with suitable voltage and/or power. Correspondingly, the onboard power conversion device 186 may comprise an AC-DC converter functioning to convert the AC electrical power 184 to DC power with suitable voltage and/or power to be supplied to the DC bus 122. In other embodiments, additionally or alternatively, the wind turbine generator 182 may be configured to provide DC power with suitable voltage and/or power 184. Correspondingly, the onboard power conversion device 186 may additionally or alternatively comprise a DC-DC converter 186 functioning to convert first DC power 184 to second DC power with suitable voltage and/or power to be supplied to the DC bus 122. The output of the onboard power conversion device 186 can be regulated or adjusted according to control signals 167 transmitted from the vehicle controller 152. The vehicle 140 shown in FIG. 5 can also be configured to operate with a plurality of modes, such as separation control mode, series hybrid control mode, and combined charging and operation control mode, which will be described in more detail below with reference to the flow chart diagrams of FIGS. 9-13.

Figure 6:
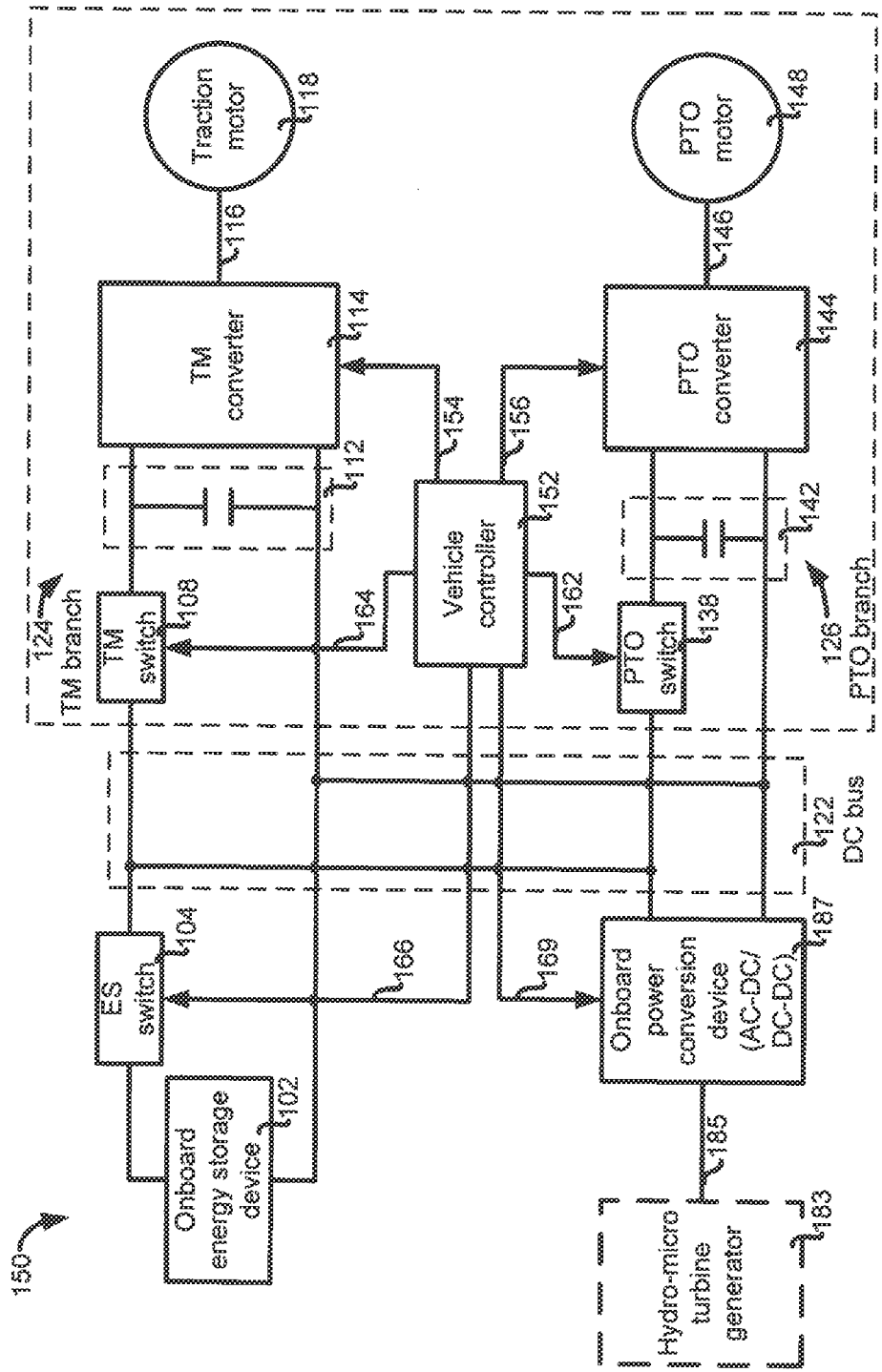
FIG. 6 is a detailed block diagram of a vehicle in accordance with an exemplary embodiment of the present disclosure.

FIG. 6 illustrates a detailed block diagram of a vehicle 150 in accordance with another exemplary embodiment of the present disclosure. The overall structure and detailed operations of the vehicle 150 show in FIG. 6 is substantially similar to what has been described above with reference to FIGS. 1-5. One difference of the vehicle 150 shown in FIG. 6 is that the vehicle 150 may be configured to be electrically coupled to a hydro-micro turbine generator 183. The hydro-micro turbine generator 183 is yet another form of renewable power generation device which is functioning to convert water wave energy into electrical power. In one embodiment, the hydro-micro turbine generator 183 may be integrated with the vehicle 150. In other embodiments, the hydro-micro turbine generator 183 may be arranged as a standalone device, that is, located remotely with respect to the vehicle 150. As shown in FIG. 6, the vehicle 150 is provided with an onboard power conversion device 187 (e.g., a AC-DC converter or a DC-DC converter) for converting electrical power 185 provided from the hydro-micro turbine generator 185 to DC power with suitable voltage and/or power to be supplied to the DC bus 122. In some embodiments, the DC power output from the onboard power conversion device 187 can be regulated according to control signals 169 transmitted from the vehicle controller 152. The vehicle 150 shown in FIG. 6 can also be configured to operate with a plurality of modes, such as separation control mode, series hybrid control mode, and combined charging and operation control mode, which will be described in more detail below with reference to the flow chart diagrams of FIGS. 9-13.

Figure 7:
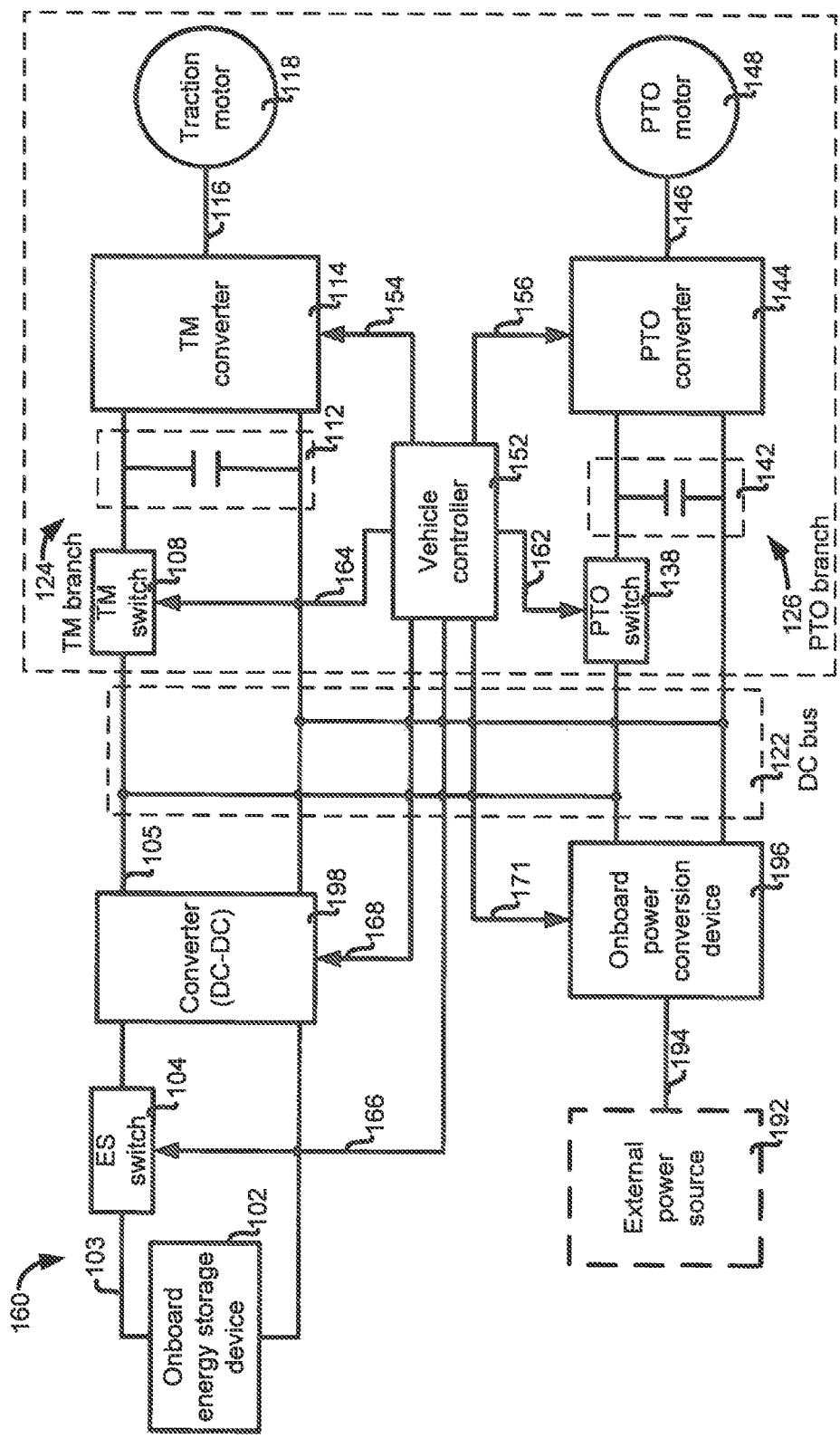
FIG. 7 is a detailed block diagram of a vehicle in accordance with an exemplary embodiment of the present disclosure.

FIG. 7 illustrates a detailed block diagram of a vehicle 160 in accordance with another exemplary embodiment of the present disclosure. The overall structure and detailed operations of the vehicle 160 is substantially similar to what has been described above with reference to FIGS. 1-6. One difference of the vehicle 160 shown in FIG. 7 is that a converter 198 is provided in association with the onboard energy storage device 102. In the illustrated embodiment, the converter 198 is illustrated being electrically coupled between the ES switch 104 and the DC bus 122. In other embodiments, the converter 198 can also be electrically coupled between the onboard energy storage device 102 and the ES switch 104. In one embodiment, the converter 198 may comprise a DC-DC converter which is configured to convert first DC power 103 provided from the onboard energy storage device 102 to second DC power 105 with suitable voltage and/or power to be supplied to the DC bus 122. In one embodiment, the DC-DC converter 198 may comprise a unidirectional DC-DC converter for performing DC power conversion, such as boosting the voltage of the first DC power 103 to match the voltage at the DC bus 122. In other embodiments, the DC-DC converter 198 may comprise a bidirectional DC-DC converter which may be useful for collecting power during regenerative or braking operations of the vehicle 160. For example, when the vehicle 160 is operating in a regenerative mode, the bidirectional DC-DC converter 198 can be operated to convert at least a part of the DC power at the DC bus 122 to DC power for charging the onboard energy storage device 102. In the regenerative mode, at least part of the DC power at the DC bus 122 can be provided from the TM branch 124 by operating the traction motor 118 as a generator, which converts motion energy of the vehicle 160 into electrical power. The DC power at the DC bus 122 can also be provided from the PTO branch 126. For example, when vehicle 160 is a forklift, the PTO motor 148 can be operated as a generator which converts gravitational potential energy of a load into electrical power. As shown in FIG. 6, the converter 198 can be operated according to control signals 168 transmitted from the vehicle controller 152 to provide desired DC power for the DC bus 122 or desired DC power for the onboard energy storage device 102.

With continued reference to FIG. 7, in the illustrated embodiment, the onboard power conversion device 196 is electrically coupled to an external power source 192 for receiving electrical power 194 provided therefrom. The external power source 192 can be any one of the power sources described above with reference to FIGS. 2-5. When the external power source 192 is available, electrical power obtained from the external power source 192 can be provided to the TM branch 124 and/or the PTO branch 126 in coordination with the onboard energy storage device 102. The vehicle 160 shown in FIG. 7 can also be configured to operate with a plurality of modes, such as separation control mode, series hybrid control mode, and combined charging and operation control mode, which will be described in more detail below with reference to the flow chart diagrams of FIGS. 8-10.

Figure 8:
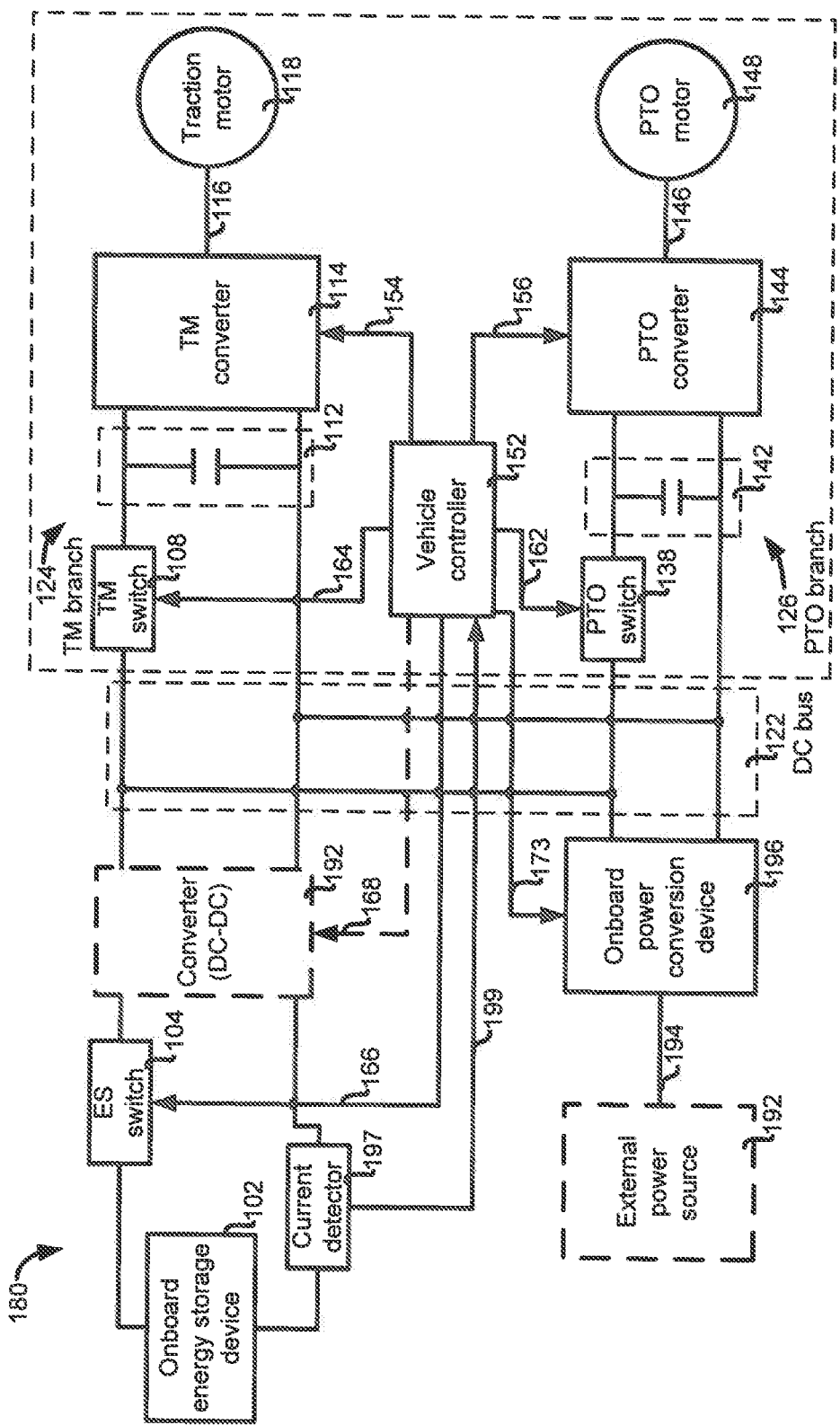
FIG. 8 is a detailed block diagram of a vehicle in accordance with an exemplary embodiment of the present disclosure.

FIG. 8 illustrates a detailed block diagram of a vehicle 180 in accordance with yet another exemplary embodiment of the present disclosure. The overall structure and operations thereof are substantially similar to what has been described above with reference to FIGS. 1-6. For example, the vehicle 180 can optionally include a unidirectional or bidirectional DC-DC converter 198 electrically coupled between the onboard energy storage device 102 and the DC bus 122. In addition, the vehicle 180 may be further provided with an onboard energy storage protection function. More specifically, the vehicle 180 may include a sensor 197 which is electrically coupled to the output of the onboard energy storage device 102 for detecting one or more electrical parameters in association with the onboard energy storage device 102. In one embodiment, as shown in FIG. 7, a current detector is used as the sensor 197 for detecting charging and/or discharging current in association with the operation of the onboard energy storage device 102. In other embodiments, other sensors or transducers may be used, including but not limited to, voltage sensors and/or thermal sensors. In response the current detection, the current detector 197 may transmit a current feedback signal 199 representing actual or practical current flowing into or flowing from the onboard energy storage device 102 to the vehicle controller 152. The vehicle controller 152 may derive a charging and/or discharging status of the onboard energy storage device 102 based at least in part on the current feedback signal 197. In one embodiment, when a state of charge (SOC) of a battery or a battery pack of the onboard energy storage device 102 is determined to be fully charged (e.g., a SOC value exceeding a preset value), the vehicle controller 152 may transmit a switching signal 166 to the ES switch 104 to open the ES switch 104 (i.e., OFF state) to stop charging the onboard energy storage device 102. In another situation, when the SOC of a battery of a battery pack of the onboard energy storage device 102 is determined to be overly discharged (e.g., a SOC value being smaller than a preset value), the vehicle controller 152 may similarly transmit a switching signal 166 to the ES switch 104 to stop discharging the onboard energy storage device 102.

It should be noted that the various embodiments of the vehicles 100, 110, 120, 140, 150, 160, 180 shown and described above are merely examples only to help explain the general principles of the present disclosure. In some embodiments, two or more of the vehicles described above can be combined in some manner. For example, in some embodiments, the vehicle 100 shown in FIG. 2 can also be configured to have an onboard power conversion device 136 that is capable of receiving electrical power both from the utility power grid 132 and the solar panel device 172 shown in FIG. 4. Thus, as long as one of the utility power grid 132 and the solar panel device 172 is available, the vehicle 100 can be operated with electrical power concurrently provided from the external power source (either the utility power grid 132 or the solar panel device) and the onboard energy storage device 102. Similarly, in some other embodiments, the vehicle 120 shown in FIG. 4 can be configured to have an onboard power conversion device 176 that is capable of receiving electrical power both from the solar panel device 172 and the wind turbine generator 182 shown in FIG. 5.

FIGS. 9-13 illustrate flowchart diagrams of methods 3000, 4000, and 5000 for operating a vehicle and/or managing power supply of a vehicle in accordance with exemplary embodiments of the present disclosure. The methods 3000, 4000, and 5000 described herein can be implemented with at least some of the vehicles 100, 110, 120, 140, 150, 160, 180 shown in FIGS. 2-8. For purpose of simplifying description of these methods, the one or more blocks of methods 3000, 4000, and 5000 will be specifically described as being tied to one or more components of the vehicle 180 shown in FIG. 8, however, the implementation of these method blocks should not be limited to the one or more components. Also, it should be noted that at least a part of blocks of these methods 3000, 4000, and 5000 shown in FIGS. 9-13 may be programmed with software instructions stored in a computer-readable storage medium which, when executed by a processor, perform various blocks of the methods 3000, 4000, and 5000. The computer-readable storage medium may include volatile and nonvolatile, removable and non-removable media implemented in any method or technology. The computer-readable storage medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can accessed by a processor.

Figure 9:
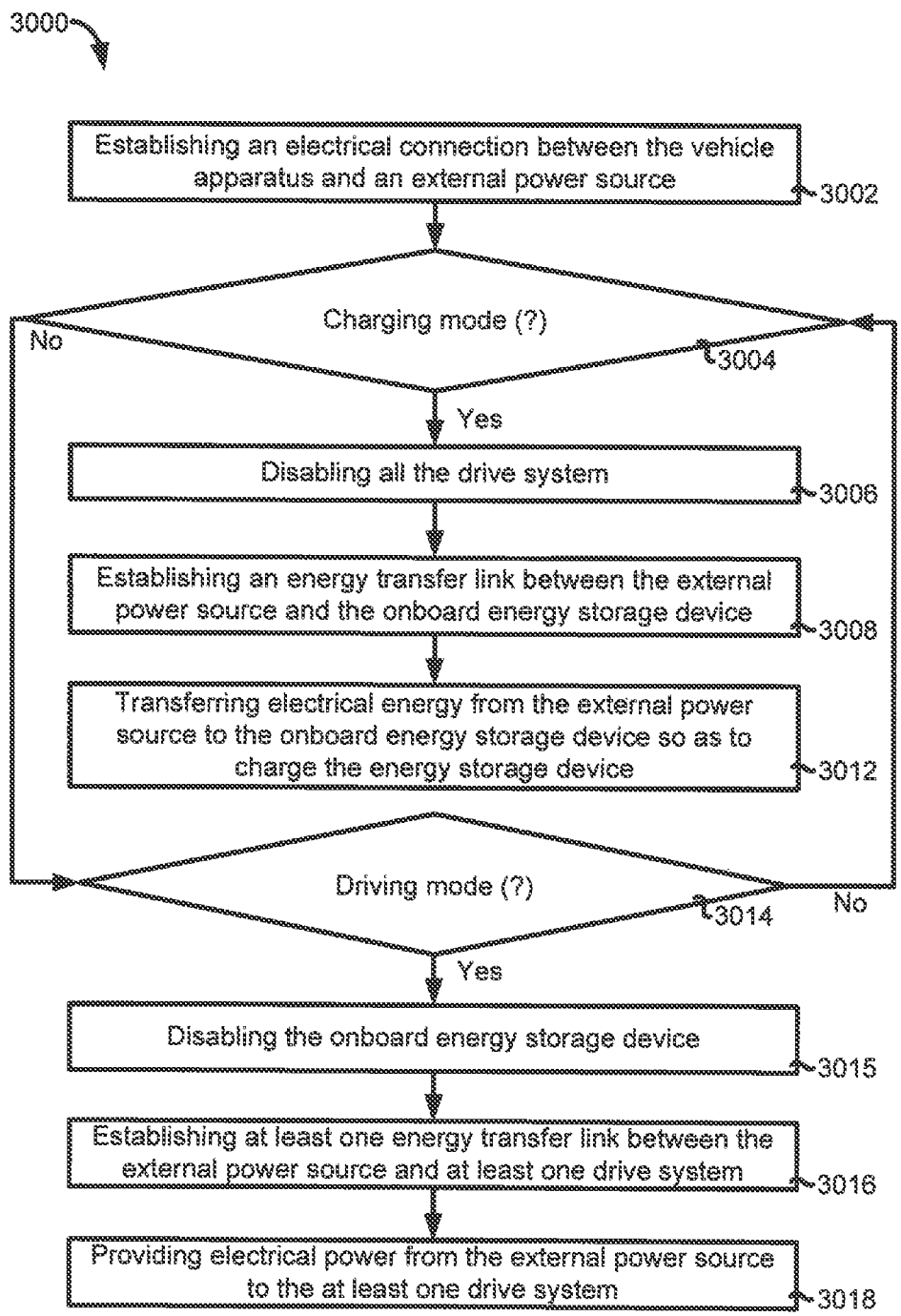
FIG. 9 is a flowchart which outlines an implementation of a method for operating a vehicle in accordance with an exemplary embodiment of the present disclosure.

Turning now to FIG. 9, the method 3000 generally provides a separate control operation mode for the vehicle 180 to implement. One benefit of providing such a separate control operation mode for the vehicle 180 is that the design of the control system of the vehicle 180 can be simplified. In one embodiment, the method 3000 may start to implement from block 3002. At block 3002, an electrical connection or coupling for interconnecting the vehicle with an external power source is established. The electrical connection may be established by plugging one or more electrical wires or cables to an electric outlet in association with the external power source 192. In other embodiments, it is possible to establish a wireless connection between the external power source 192 and the vehicle 180 for wireless electrical power transfer. In one embodiment, the vehicle 180 is particularly equipped with an onboard power interface such as an onboard power conversion device 196 (e.g., AC-DC converter) for converting the electrical power 194 (e.g., AC electrical power) received from the external power source 192 to a suitable form (e.g., DC electrical power) for various components of the vehicle 180.

At block 3004, the method 3000 continues to implement by determining whether a charging mode of the vehicle is enabled. More specifically, the determining at block 3004 can be made by the vehicle controller 152 to ascertain whether a battery or a battery pack of the onboard energy storage device 102 has sufficient remaining power. If the determining by the vehicle controller 152 reveals that the onboard energy storage device 102 has low remaining power, that is, the vehicle 180 should be charged, the method 3000 then proceeds to block 3006 to implement. On the other hand, if the determining by the vehicle controller 152 reveals that a battery or a battery pack of the onboard energy storage device 102 has sufficient remaining power, that is, the vehicle 180 doesn't need to be charged, the method 3000 may proceed to block 3014 to implement, which will be described later.

At block 3006, following the affirmative determination at block 3004 that the vehicle should be operating in the charging mode, all the drive system of the vehicle is disabled. More specifically, in one embodiment, a traction drive system or a traction branch 124 shown in FIG. 8 for driving motion of the vehicle 180 is disabled. In another embodiment, additionally, a PTO drive system or a PTO branch 126 shown in FIG. 8 for performing one or more specific tasks in association with the vehicle 180 is disabled. In a particular embodiment, a TM switch 108 in the TM branch 124 and/or a TPO switch 138 in the PTO branch 126 can be opened or turned off by switching signals 164, 162 transmitted from the vehicle controller 152. In other embodiments, the TM switch 108 and the PTO switch 138 can be opened or turned off in a manual manner.

At block 3008, further following the affirmative determination at block 3004 that the vehicle should be operating in the charging mode, the method 3000 may continue to implement by establishing an energy transfer link between the external power source and the onboard energy storage device. In one embodiment, the establishment of the energy transfer link can be achieved by closing or turning on the ES switch 104 according to switching signal 168 transmitted from the vehicle controller 152. In alternative embodiments, the ES switch 104 can also be closed or turned on by manual operation of an operator or a user such as a driver.

At block 3012, the method 3000 continues to implement by transferring at least a part of the electrical energy from the external power source to the onboard energy storage device. In one embodiment, the electrical power provided from the external power source 132 is first converted by the onboard power conversion device 136 such as an AC-DC converter to DC electrical power. The DC electrical power then is delivered through the DC bus 122 and the ES switch 104 to the onboard energy storage device 102, such that the onboard energy storage device can be charged. Various charging strategies may be employed for charging the onboard energy storage device 102. For example, the onboard energy storage device may be charged with a constant current or a constant voltage or a combination thereof.

At block 3014, following the negative determination made at block 3004 that the vehicle is not operating in the charging mode, the method 3000 may continue to determine whether the vehicle should be operating in a driving mode. The determining may be made by the vehicle controller 152 to ascertain whether one or more command signals for driving the vehicle 180 has been received. If the determining by the vehicle controller 152 reveals that one or more command signals has been received, that is the vehicle 180 should be operating in the driving mode, the method 3000 may proceed to block 3015 to implement, which will be described later. On the other hand, if the determining by the vehicle controller 152 reveals that there aren't any command signals received by the vehicle 180, that is, the vehicle 180 is not operating in the driving mode, the method 3000 may return back to block 3004 for further determining whether the vehicle 180 should be operating in charging mode.

At block 3015, following the affirmative determination that the vehicle is operating in the driving mode, the method 3000 may continue to implement by disabling the onboard energy storage device of the vehicle. In one embodiment, the ES switch 104 is turned off or opened according to switching signal 166 transmitted from the vehicle controller 152, such that the energy transfer link between the DC bus 122 and the onboard energy storage device 102 is cut off, thereby, the onboard energy storage device 102 stops charging and/or discharging.

At block 3016, following the affirmative determination that the vehicle is operating in the driving mode, the method 3000 may continue to implement by establishing at least one energy transfer link between the external power source and at least one drive system of the vehicle. In one embodiment, an energy transfer link is established between the external power source 192 and a traction drive system or a TM branch 124. More specifically, a TM switch 108 is turned on or closed by a switching signal 164 transmitted from a vehicle controller 152. In another embodiment, the TM switch 108 may be turned on or closed by manual operation. In another embodiment, additionally or alternatively, another energy transfer link is established between the external power source 192 and a PTO drive system or a PTO branch 126 shown in FIG. 8. More specifically, the establishment of the another energy transfer link may be achieved by turning on or closing the PTO switch 138 according to switching signal 162 transmitted from the vehicle controller 152. In alternative embodiment, the PTO switch 138 may be turned on or closed by manual operation.

At block 3018, with the at least one established energy transfer link, electrical power is transferred from the external power source to the at least one drive system. In one embodiment, the electrical power provided from the external power source is first converted to a suitable form (e.g., DC power) for the DC bus 122 by the onboard power interface or the onboard power conversion device 136 (e.g., AC-DC converter). Then, the DC electrical power on the DC bus 122 is delivered through the established energy transfer link to the TM branch 124 for driving motion of the vehicle 180. In another embodiment, the DC electrical power on the DC bus 122 can be delivered through the another established energy transfer link to the PTO branch 126 for performing one or more specific tasks in association with the vehicle 180.

As long as the electrical power from the external power source 132 is available, the onboard power interface or the onboard power conversion device 136 continues supplying electrical power to the DC bus 122 to maintain the movement of the vehicle 180 or to maintain the one or more specific tasks implementation in association with the vehicle 180. The benefit of using externally-supplied electrical power for driving motion of the vehicle 180 or performing one or more special task in association with vehicle 180 is that the power stored in the battery or battery pack of the onboard energy storage device 102 can be reserved for extending the overall mileage of the vehicle 180. For example, in one embodiment, the vehicle 180 may be embodied as an electric tractor. When an external power source such as a utility power grid 132 is available, the electric tractor 180 can be operated with the electrical power 134 provided from the utility power grid 132 without consuming the energy stored in the battery or battery pack of the onboard energy storage device 102. After some tasks such as plowing grounds have been performed, and the external power source such as the utility power grid 132 is unavailable for supplying electrical power to maintain the driving of the vehicle 180, the vehicle 180 can quickly switch to an internal power supply mode and use electrical power obtained from the onboard energy storage device 102 to maintain the operation of the vehicle 180.

Figure 10:
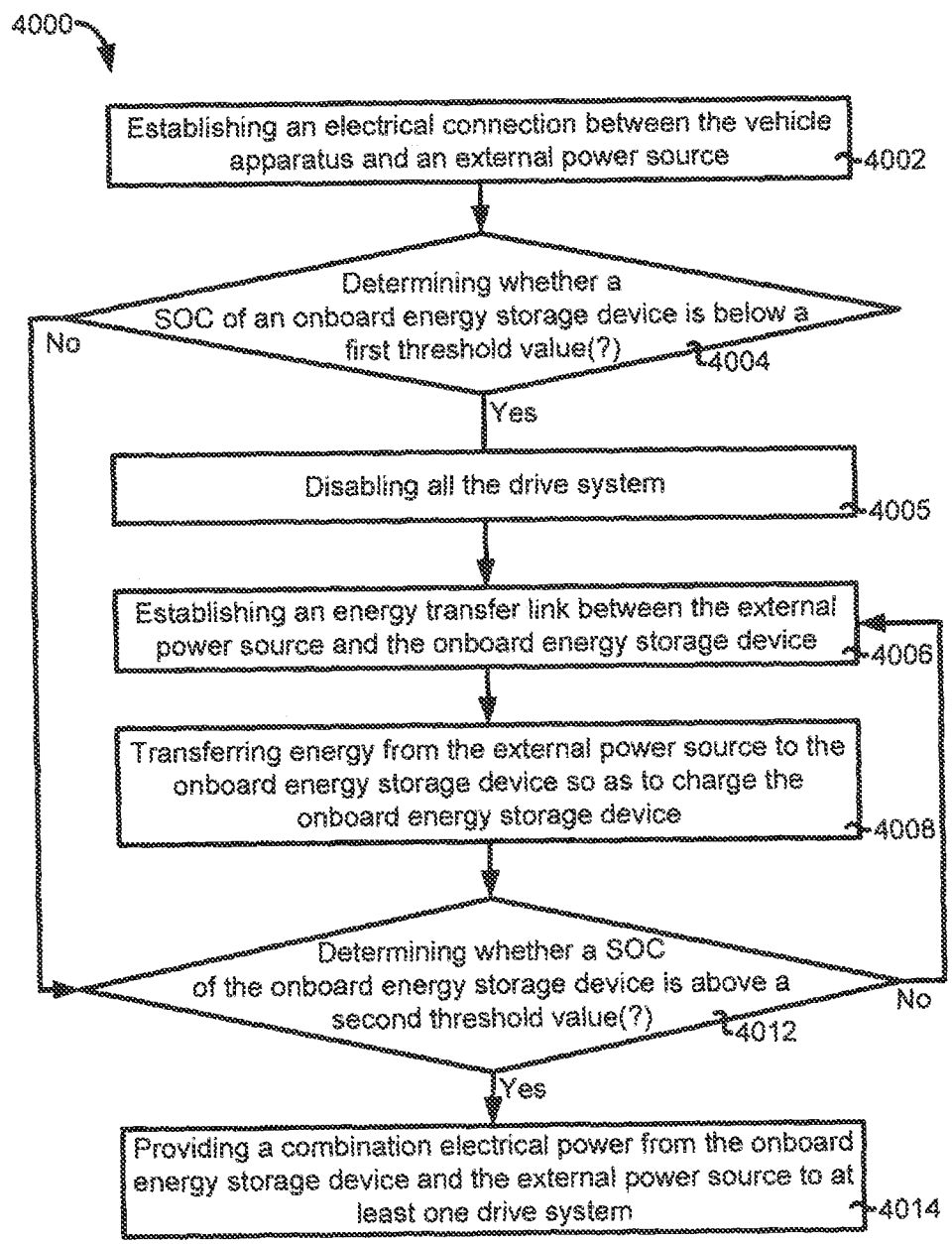
FIG. 10 is a flowchart which outlines an implementation of a method for operating a vehicle in accordance with an exemplary embodiment of the present disclosure.

Referring to FIG. 10, the method 4000 generally provides a series hybrid control operation mode for the vehicle 180 to implement or operate with. The method 4000 contains similar blocks as those have been described with reference to FIG. 9. For example, the method 4000 contains a block 4002 similar to block 3002 for establishing an electrical connection between the vehicle and an external power source.

At block 4004, the method 4000 continues to implement by determining whether an onboard energy storage device has a low remaining power. In one embodiment, the determining may be made by a vehicle controller 152 to ascertain whether a state of charge (SOC) of an battery or battery pack of the onboard energy storage device 102 is equal to or below a first threshold value (may also be referred to as a low-SOC threshold value). If the determining by the vehicle controller 152 reveals that the SOC of the onboard energy storage device is equal to or below the first threshold value, that is, the onboard energy storage device 102 has low remaining power, the method 4000 may proceed to block 4005 to implement, which will be described in more detail later. On the other hand, if the determining by the vehicle controller 152 reveals that the SOC of the onboard energy storage device 102 is not equal to or below the first threshold value, the method 4000 may proceed to block 4012 to implement, which will be described in more detail later.

At block 4005, all the drive system of the vehicle is disabled. In one embodiment, a traction drive system or a traction branch 124 shown in FIG. 8 for driving motion of the vehicle 180 is disabled. In another embodiment, additionally, a PTO drive system or a PTO branch 126 shown in FIG. 8 for performing one or more specific tasks in association with the vehicle 180 is disabled. In a particular embodiment, a TM switch 108 in the TM branch 124 and/or a TPO switch 138 in the PTO branch 126 can be opened or turned off by switching signals 164, 162 transmitted from the vehicle controller 152. In other embodiments, the TM switch 108 and the PTO switch 138 can be opened or turned off in a manual manner.

At block 4006, following the affirmative determination that the onboard energy storage device has low remaining power, the method 4000 continues to implement by establishing an energy transfer link between the external power source and the onboard energy storage device. With the established energy transfer link, the method 4000 may move to block 4008 to implement, where at least a part of the electrical energy provided from the external power source is delivered to the onboard energy storage device so as to charge the energy storage device. Blocks 4006, 4008 are substantially similar to the blocks 3008 and 3012 that have been shown and described with reference to FIG. 9, thus, detailed descriptions of the two blocks 4006, 4008 are omitted here.

At block 4012, the method 4000 continues to implement by determining whether an onboard energy storage device of the vehicle has sufficient remaining power. In one embodiment, the determining at block 4012 may be made by the vehicle controller 152 to ascertain whether the SOC of a battery or a battery pack of the onboard energy storage device 102 is equal to or above a second threshold value (may also be referred to as high-SOC threshold value). If the determination made by the vehicle controller 152 reveals that the SOC of the battery or battery pack of the onboard energy storage device 102 is equal to or above the second threshold value or the high-SOC threshold value, that is, the onboard energy storage device 102 has sufficient remaining power, the method 4000 may proceed to the block 4014 to implement, which will be described in more detail later. On the other hand, if the determining made by the vehicle controller 152 reveals that the SOC of the battery or battery pack of the onboard energy storage device 102 is not equal to or above the second threshold value or the high-SOC threshold value, the method 4000 may proceed to block 4016 to implement, which will be described in more detail later.

Figure 11:
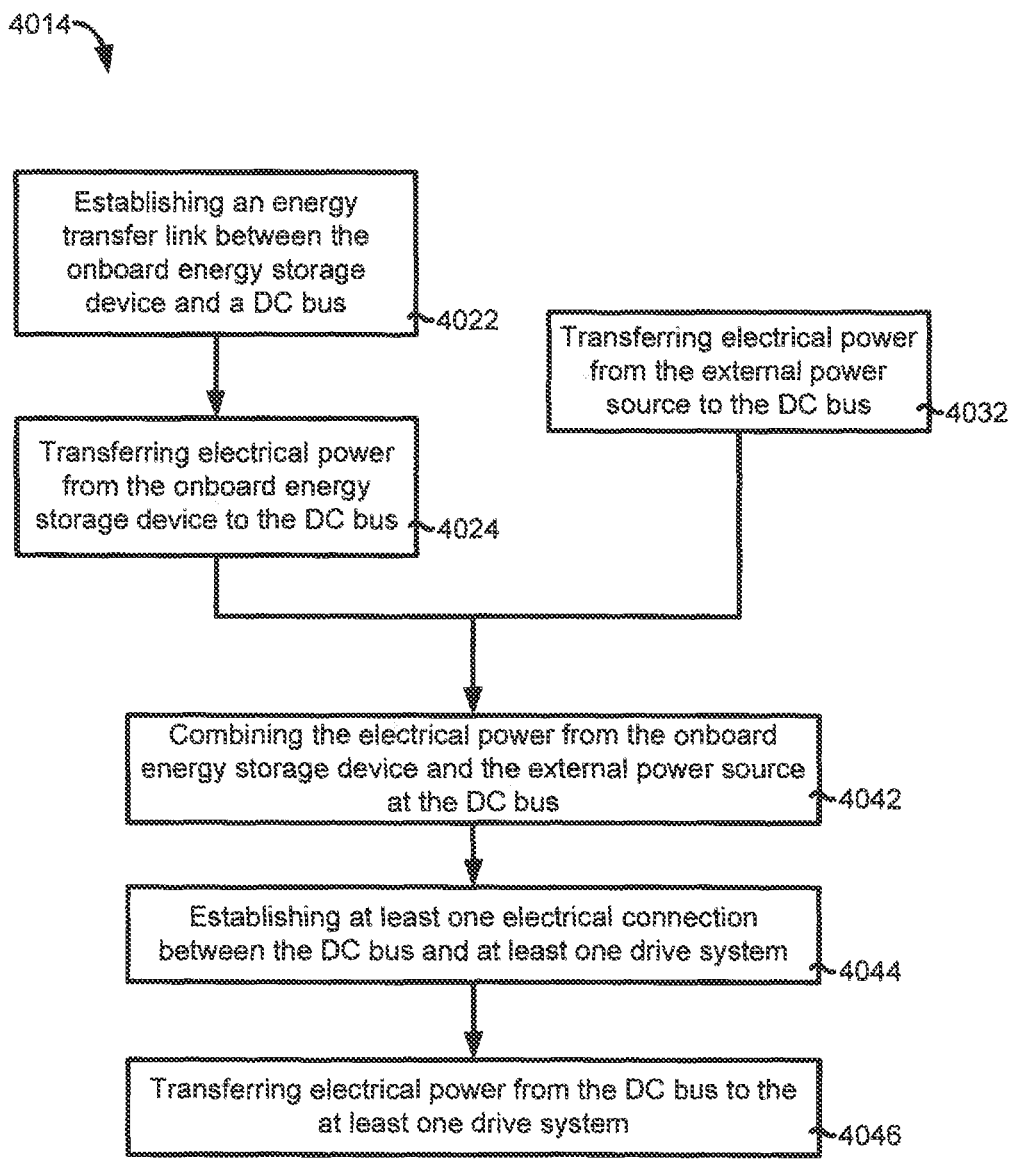
FIG. 11 is a flowchart which outlines an implementation of a block 4014 shown in FIG. 10 in accordance with an exemplary embodiment of the present disclosure.

At block 4014, the method 4000 continues to implement by providing a combination electrical power from the onboard energy storage device and the external power source to at least one drive system. Implementation of the block 4014 may involve a plurality of sub-blocks. FIG. 11 illustrates a more detailed flowchart diagram of the block 4014 in accordance with one exemplary embodiment.

Referring to FIG. 11, at sub-block 4022, an energy transfer link between the onboard energy storage device and a DC bus is established. In one embodiment, the establishment of the energy transfer link may be achieved by turning on or closing the ES switch 104 according to switching signal 166 transmitted from the vehicle controller 152. At sub-block 4024, with the established energy transfer link, electrical power is transferred from the onboard energy storage device 102 to the DC bus 122.

Sub-block 4032 may be implemented concurrently with the sub-block 4024. At sub-block 4032, at least part of electrical power is transferred from the external power source to the DC bus. In one embodiment, as shown in FIG. 8, an onboard power conversion device 196 is utilized for converting electrical power provided from the external power source 192 to DC electrical power, which in turn is supplied to the DC bus 122.

At sub-block 4042, the electrical power transferred from the onboard energy storage device and the external power source are combined. In one embodiment, the electrical power provided from the onboard energy storage device 102 and the electrical power provided from the onboard power interface or the onboard power conversion device 196 is combined at the DC bus 122.

At sub-block 4044, at least one electrical connection between the DC bus and a drive system is established. In one embodiment, a first energy transfer link between the DC bus 122 and the TM branch 124 is established. The establishment of the first energy transfer link may be achieved by transmitting a switching signal 164 from the vehicle controller 152 to a TM switch 108, so that the TM switch 108 can be turned on or closed according to the switching signal 164. In another embodiment, a second energy transfer link between the DC bus 122 and the PTO branch 126 can be established. The establishment of the second energy transfer link can be achieved by turning on or closing the PTO switch 138 according to switching signal 162 transmitted from the vehicle controller 152.

At sub-block 4046, the process continues to implement by transferring electrical power through the established energy transfer link. In one embodiment, when the first energy link between the DC bus 122 and the TM branch 124 is established, DC electrical power at the DC bus 122 can be provided to TM inverter 114 in the TM branch 124. The TM inverter 114 converts the received DC electrical power to AC electrical power 116 which is used by the traction motor 118 to provide mechanical output such as torque output for driving motion of the vehicle 180. In another embodiment, when the second energy transfer link between the DC bus 122 and the PTO branch 126 in established, DC electrical power at the DC bus 122 can be transferred to the PTO inverter 144 in the PTO branch 126. The PTO inverter 144 converts the received DC electrical power to AC electrical power 146 which is used by the PTO motor to provide mechanical outputs such as torques outputs to perform one or more specific tasks in association with the vehicle 180.

Figure 12:
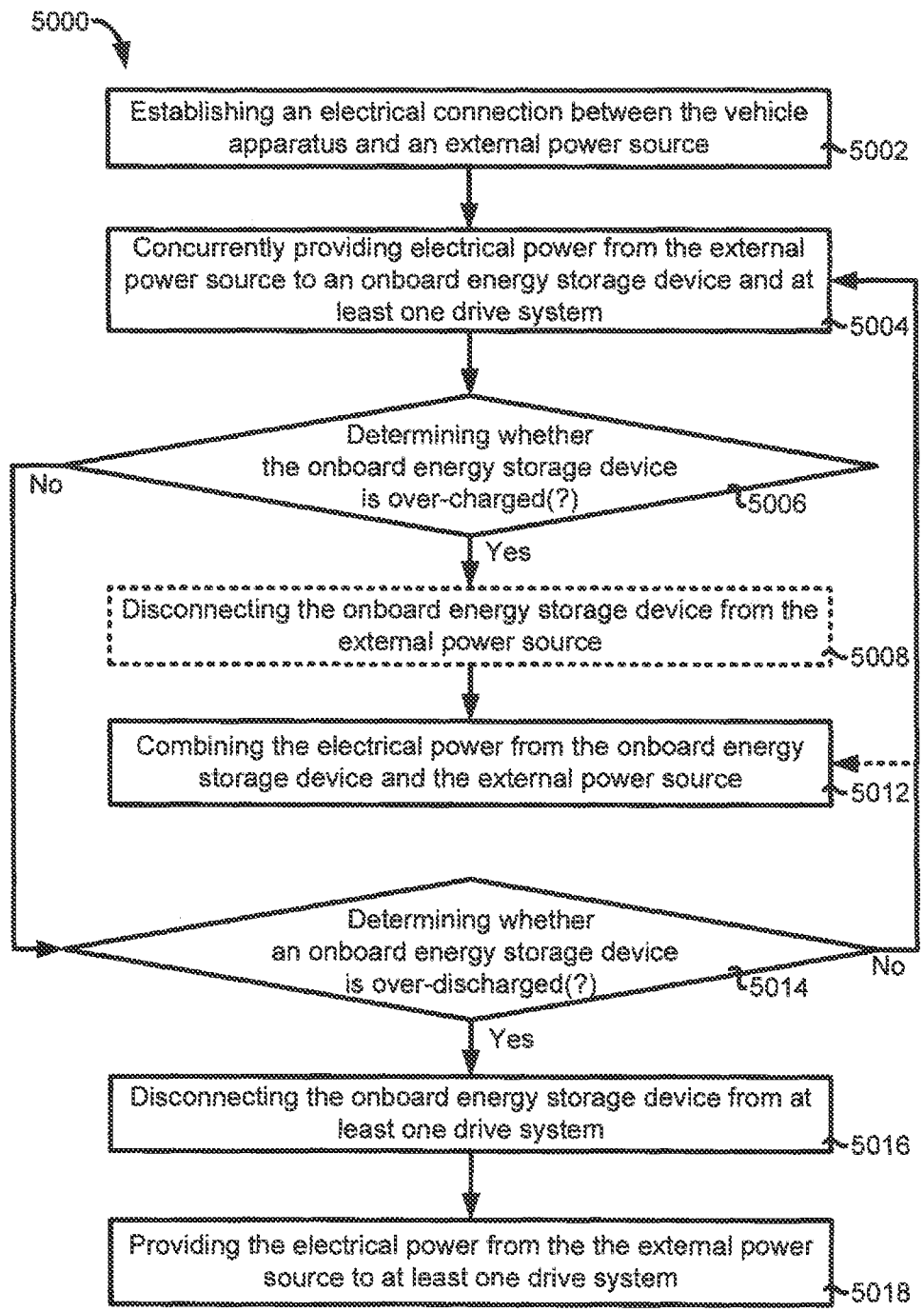
FIG. 12 is a flowchart which outlines an implementation of a method for operating a vehicle in accordance with yet an exemplary embodiment of the present disclosure.

Referring now to FIG. 12, the method 5000 generally provides a combined charging and operation control mode for the vehicle 180 to implement or operate with. The method 5000 contains similar blocks as those have been described with reference to FIGS. 9-10. For example, the method 5000 contains a block 5002 which is similar to blocks 3002, 4002 described above for establishing an electrical connection between the vehicle and an external power source.

Figure 13:
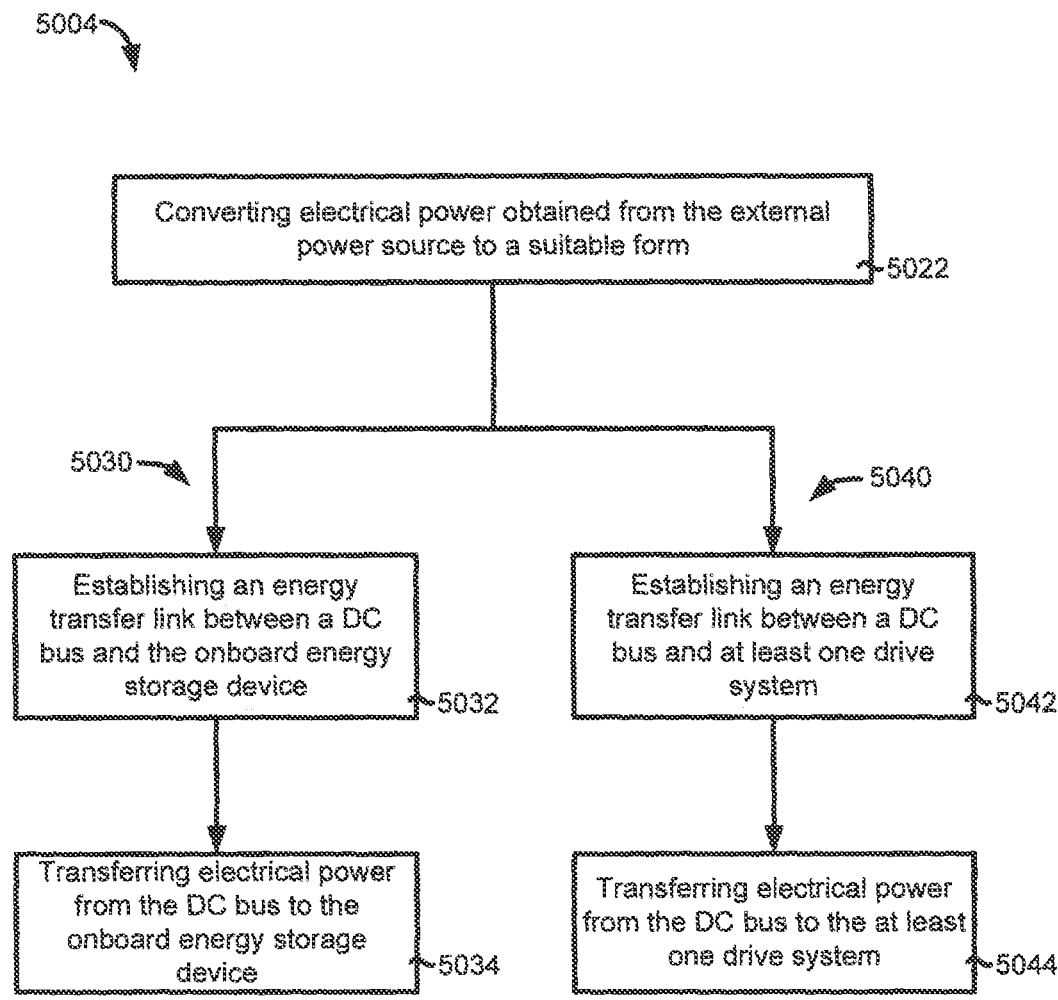
FIG. 13 is a flowchart which outlines a detailed implementation of a block 5004 shown in FIG. 12 in accordance with an exemplary embodiment of the present disclosure.

At block 5004, following the established electrical connection between the vehicle and the external power source, electrical power from the external power source can be concurrently provided to the onboard energy storage device and at least a drive system of the vehicle. In one embodiment, concurrently providing electrical power from the external power source to the onboard energy storage device and at least one drive system may involve a plurality of actions to be performed. FIG. 13 illustrates various actions that may be involved in block 5004 in accordance with one exemplary embodiment of the present disclosure.

Referring to FIG. 13, at sub-block 5022, electrical power obtained from the external power source is converted into a suitable form. In one embodiment, as shown in FIG. 8, the onboard power conversion device 196 converts the electrical power (e.g., AC electrical power from a utility power grid) into DC electrical power for supply to the DC bus 122. In some specific embodiments, the power conversion device 196 can be controlled to operate at a constant output current mode. In the constant output current mode, the onboard power conversion device 196 supplies the DC electrical power with a constant current to the DC bus 122. In one embodiment, a desired constant current value can be determined based at least in part on the power that the traction motor 118 and/or the PTO motor 148 desired to provide as well as the power that the battery or batter pack of the onboard energy storage device 102 is desired to be charged with. After the desired current reference is determined, a command signals representing the desired current reference can be input to the vehicle controller 152, which in turn transmits control signals 171 to cause the onboard power conversion device 196 to provide the desired reference current output.

Further referring to FIG. 13, after sub-block 5022, the process is basically split into two parallel branches 5030 and 5040. In the first branch 5030, at sub-block 5032, an energy transfer link between the onboard energy storage device and a DC bus is established. In one embodiment, as shown in FIG. 8, the establishment of the energy transfer link between the onboard energy storage device 102 and the DC bus 122 can be achieved by turning on or closing the ES switch 104 according to switching signal 166 transmitted from the vehicle controller 152. In alternative embodiment, the ES switch 104 may be turned on or closed manually. At sub-block 5034, with the established energy transfer link between the DC bus 122 and the onboard energy storage device 102, a first part of electrical power at the DC bus 122 is transferred from the DC bus 122 to the onboard energy storage device 102.

Further referring to FIG. 13, at sub-block 5042 in the second branch 5040, an energy transfer link between the DC bus and at least one drive system is established. In one embodiment, a first energy transfer link between the DC bus 122 and the TM drive system or the TM branch 124 is established. More specifically, the establishment of the first energy transfer link between the DC bus 122 and the TM branch 124 can be established by turning on or closing the TM switch 108 according to the switching signal 164 transmitted from the vehicle controller 152. Alternatively, the TM switch 108 can also be turned on or closed manually. In another embodiment, a second energy transfer link between the DC bus 122 and the PTO drive system or the PTO branch 126 is established. More specifically, the establishment of the second energy transfer link can be achieved by turning on or closing the PTO switch 138 according to switching signal 162 transmitted from the vehicle controller 152. Alternatively, the PTO switch 138 can also be turned on or closed manually.

At sub-block 5044 of the second branch 5040, electrical power at the DC bus can be delivered through the established energy transfer link to the at least one drive system. In one embodiment, at least a second part of DC electrical power at the DC bus 122 can be delivered through the first energy transfer link to the TM inverter 114 in the first branch 124. The TM inverter 114 converts the DC electrical power to AC electrical power for driving the traction motor 118 to provide mechanical output such as torque output to drive motion of the vehicle 180. In another embodiment, at least a second part of DC electrical power at the DC bus 122 can be delivered through the second energy transfer link to the PTO converter 144 in the second branch 126. The PTO converter 144 converts DC electrical power to AC electrical power for driving the PTO motor 148 to provide mechanical output such as torque outputs to perform one or more specific tasks in association with the vehicle 180.

Referring back to FIG. 12, at block 5006, the method 5000 continues to determine whether an onboard energy storage device is fully charged. The purpose of this block 5006 is to ensure a battery or a battery pack of the onboard energy storage device will not be over-charged, because the battery lifetime can be significantly reduced when the battery or battery pack of the onboard energy storage device is over-charged. In one embodiment, as shown in FIG. 8, a sensor 197 such as a current detector is used for detecting a charging current in association with the battery or battery pack of the onboard energy storage device 102. The charging current feedback detected with the current detector 197 can be supplied to the vehicle controller 152 for calculating or deducing a charging energy or a charging status of the battery or battery pack of the onboard energy storage device. Thus, determination can be made to ascertain whether the battery or battery pack of the onboard energy storage device is fully charged by comparing the calculated charging energy or charging status with a predefined value. If the determination reveals that the onboard energy storage device is fully charged, the method 5000 may proceed to block 5008 or alternatively to block 5012 to implement, which will be described in more detail later. If the determination reveals that the onboard energy storage device is not fully charged, the method 5000 may proceed to block 5014, which will be described in more detail later.

At block 5008, following the determination at block 5006 that the onboard energy storage device has been fully charged, the onboard energy storage device may be disconnected from the external power source. In one embodiment, the ES switch 104 is turned off or opened according to switching signal 166 transmitted from the vehicle controller 152, such that the energy transfer link between the DC bus 122 and the onboard energy storage device 102 is cut off. In alternative embodiment, the ES switch 104 can be turned off or opened manually for cutting off the energy transfer link. As shown with phantom line in FIG. 12, the block 5008 may be omitted in some implementations. In this case, the method 5000 may proceed to block 5012, particularly, electrical power from the external power source and the onboard energy storage device are combined. In one embodiment, the combined electrical power may be transferred to at least one drive system such as the TM branch 124 and PTO branch 126 shown in FIG. 8. The operations involve in block 5014 is substantially similar to the block 4014 shown and described above with reference to FIGS. 10-11, thus, detailed descriptions of the block 5012 is omitted herein.

At block 5014, following the negative determination that the onboard energy storage device is not fully charged, the method 5000 continues to determine whether the onboard energy storage device is over-discharged. In one embodiment, the current detector 197 as shown in FIG. 8 can also be used to detect the direction of the current flowing through the energy transfer link between the onboard energy storage device 102 and the DC bus 122. More specifically, when the current is detected being flowing from the onboard energy storage device 102 to the DC bus 122, it represents that the onboard energy storage device 102 is discharging. Further, the current feedback signals 199 can be transmitted to the vehicle controller 152 to further calculate or deduce a discharging status of the onboard energy storage device 102. Thus, determination can be made to ascertain whether the onboard energy storage device is over-discharged by comparing the discharging status with a predefined value. If the determination reveals that the onboard energy storage device has been over-discharged, the method 5000 may proceed to block 5016 to implement, which will be described in more detail later. If the determination reveals that the onboard energy storage device hasn't been over-discharged, the method 5000 may return back to block 5004 for concurrently providing electrical power from the external power source to the onboard energy storage device and at least one drive system. In an alternative embodiment, following the negative determination at block 5014, the method 5000 may return back to block 5012 to implement, to combine the electrical power from the onboard energy storage device and the external power source.

At block 5016, following the affirmative determination at block 5014 that the onboard energy storage device is over-discharged, the method 5000 continues to implement to disconnect the onboard energy storage device with the at least one drive system. It is also beneficial to detect whether a battery or battery pack of the onboard energy storage device is over-discharging, because an over-discharged battery or battery pack also has a reduced battery lifetime. In one embodiment, the disconnection is achieved by turning off or opening the ES switch 104 according to the switching signal 166 transmitted from the vehicle controller 152, such that the energy transfer link between the DC bus 122 and the onboard energy storage device 102 is cut off, thereby, the onboard energy storage device 102 cannot supply electrical power to the TM branch 124 and the PTO branch 126. Alternatively, the ES switch 104 can be turned off or opened in a manual manner.

At block 5018, the method 5000 continues to implement by providing electrical power from the external power source to at least one drive system. For example, as shown in FIG. 8, the electrical power from the external power source 12 can be converted by the onboard power conversion device 196 to DC electrical power for supply to the DC bus 122. In one embodiment, by turning on the TM switch 108, the electrical power at the DC bus 122 can be supplied to the TM branch 124 for driving motion of the vehicle 180. In another embodiment, by turning on the PTO switch 138, the electrical power at the DC bus 122 can be supplied to the PTO branch 126 for performing one or more tasks in association with the vehicle 180.

Although the embodiments discussed herein relate to the use with vehicles, aspects of the invention are not limited to that. Aspects of the invention may be used with other applications, such as elevators or escalators.

While the invention has been described with reference to exemplary embodiments, it will be understood by those skilled in the art that various changes may be made and equivalents may be substituted for elements thereof without departing from the scope of the invention. Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle comprising:
   an energy storage device;
   a power interface coupleable to a power source external to the vehicle;
   a DC bus coupleable to the energy storage device and the power interface;
   a traction drive system coupleable to the DC bus, the traction drive system configured to receive electrical energy from the energy storage device for enabling movement of the vehicle in a driving mode;
   a power take-off (PTO) drive system coupleable to the DC bus, the PTO drive system configured to receive electrical energy from the energy storage device and the power interface for enabling movement of at least one implement of the vehicle;
   a traction switch coupled between the DC bus and the traction drive system, the traction switch configured to:
   be selectively opened to disable the traction drive system when the power interface is coupled to the external power source; and
   be selectively closed to allow electrical energy from the energy storage device to be transferred to the traction drive system when the vehicle is operating in the driving mode; and
   a PTO switch coupled between the DC bus and the PTO drive system, the PTO switch configured to be selectively closed to enable the PTO drive system when the power interface is coupled to the external power source.

2. The vehicle of claim 1, wherein the PTO drive system comprises a PTO converter coupled to a PTO motor.

3. The vehicle of claim 1, wherein the power interface comprises a power conversion device configured to be coupled to at least one of a utility power grid, a portable electrical generator, a solar panel device, a wind turbine generator, and a hydro turbine generator.

4. The vehicle of claim 1, further comprising a DC-DC converter coupled between the energy storage device and the DC bus.

5. The vehicle of claim 1, further comprising an energy storage (ES) switch coupled between the energy storage device and the DC bus.

6. The vehicle of claim 1, wherein the traction drive system comprises a traction motor converter coupled to a traction motor.

7. A method for operating a vehicle, the vehicle including an energy storage device and power interface coupleable to a DC bus, a traction drive system coupleable to the DC bus via a traction switch, and a power take-off (PTO) drive system coupleable to the DC bus via a PTO switch, the method comprising:
   opening the traction switch to disable the traction drive system when the power interface is coupled to a power source external to the vehicle; and
   closing the traction switch to allow electrical energy from the energy storage device to be transferred to the traction drive system when the vehicle is operating in a driving mode; and
   closing the PTO switch to enable the PTO drive system when the power interface is coupled to the external power source.

8. The vehicle of claim 1, wherein the PTO switch is configured to be selectively opened when the power interface is coupled to the external power source and the state of charge of the energy storage device is equal to or below a predetermined threshold.

9. The vehicle of claim 5, wherein the ES switch is configured to be selectively closed to enable the energy storage device to be charged and the PTO switch is configured to be selectively closed to enable the PTO drive system when the power interface is coupled to the external power source and the state of charge of the energy storage device is above a predetermined threshold.

10. The vehicle of claim 5, wherein the ES switch and the traction switch are configured to be selectively closed to enable the traction drive system when the power interface is not coupled to the external power source.

11. The vehicle of claim 5, wherein the ES switch and the traction switch are configured to be selectively closed to enable the traction drive system and the PTO switch is configured to be selectively opened to disable the PTO drive system when the power interface is not coupled to an external power source and the state of charge of the energy storage device is equal to or below a predetermined threshold.

12. A vehicle comprising:
an energy storage device;
a power interface coupleable to a power source external to the vehicle;
a DC bus coupleable to the energy storage device and the power interface;
a traction drive system coupleable to the DC bus, the traction drive system configured to receive electrical energy from the energy storage device for enabling movement of the vehicle in a driving mode;
a power take-off (PTO) drive system coupleable to the DC bus, the PTO drive system configured to receive electrical energy from the energy storage device and the power interface for enabling movement of at least one implement of the vehicle;
a traction switch coupled between the DC bus and the traction drive system;
a PTO switch coupled between the DC bus and the PTO drive system; and
a control system configured to:
selectively open the traction switch to disable the traction drive system when the power interface is coupled to the external power source;
selectively close the traction switch to allow electrical energy from the energy storage device to be transferred to the traction drive system when the vehicle is operating in the driving mode; and
selectively close the PTO switch to enable the PTO drive system when the power interface is coupled to the external power source.

13. The vehicle of claim 12, wherein the PTO drive system comprises a PTO converter coupled to a PTO motor.

14. The vehicle of claim 12, wherein the power interface comprises a power conversion device configured to be coupled to at least one of a utility power grid, a portable electrical generator, a solar panel device, a wind turbine generator, and a hydro turbine generator.

15. The vehicle of claim 12, further comprising a DC-DC converter coupled between the energy storage device and the DC bus.

16. The vehicle of claim 12, further comprising an energy storage (ES) switch coupled between the energy storage device and the DC bus.

17. The vehicle of claim 12, wherein the traction drive system comprises a traction motor converter coupled to a traction motor.

18. The vehicle of claim 12, wherein the control system is further configured to selectively open the PTO switch when the power interface is coupled to the external power source and the state of charge of the energy storage device is equal to or below a predetermined threshold.

19. The vehicle of claim 16, wherein the control system is further configured to selectively close ES switch to enable the energy storage device to be charged and selectively close the PTO switch to enable the PTO drive system when the power interface is coupled to the external power source and the state of charge of the energy storage device is above a predetermined threshold.

20. The vehicle of claim 16, wherein the control system is further configured to selectively close the ES switch and the traction switch to enable the traction drive system when the power interface is not coupled to the external power source.

21. The vehicle of claim 16, wherein the control system is further configured to selectively close ES switch and the traction switch to enable the traction drive system and selectively open the PTO switch to disable the PTO drive system when the power interface is not coupled to an external power source and the state of charge of the energy storage device is equal to or below a predetermined threshold.

* * * * *